(12) United States Patent
Yokoyama et al.

(10) Patent No.: US 8,673,443 B2
(45) Date of Patent: Mar. 18, 2014

(54) PRESSURE-SENSITIVE ADHESIVE TAPE OR SHEET HAVING LIGHT-REFLECTIVE PROPERTY AND/OR LIGHT-SHIELDING PROPERTY, AND LIQUID CRYSTAL DISPLAY APPARATUS

(75) Inventors: Junji Yokoyama, Ibaraki (JP); Yoshikazu Soeda, Ibaraki (JP); Yutaka Tosaki, Ibaraki (JP); Koichi Ikeda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 1810 days.

(21) Appl. No.: 11/708,634

(22) Filed: Feb. 21, 2007

(65) Prior Publication Data

US 2007/0196647 A1    Aug. 23, 2007

(30) Foreign Application Priority Data

Feb. 21, 2006 (JP) .................. 2006-043759
Dec. 11, 2006 (JP) .................. 2006-333194

(51) Int. Cl.
*B32B 7/12* (2006.01)
*B32B 15/04* (2006.01)

(52) U.S. Cl.
USPC ........................... 428/354; 428/355; 428/343

(58) Field of Classification Search
USPC ........................... 428/354, 343, 355
See application file for complete search history.

(56) References Cited

U.S. PATENT DOCUMENTS

| 5,229,207 A | 7/1993 | Paquette et al. |
| 2004/0028895 A1* | 2/2004 | Yamakami et al. ............ 428/354 |
| 2004/0260009 A1 | 12/2004 | Tosaki et al. |
| 2005/0163995 A1 | 7/2005 | Yokoyama et al. |
| 2005/0202238 A1 | 9/2005 | Kishioka et al. |
| 2005/0209380 A1 | 9/2005 | Wada et al. |
| 2007/0218276 A1* | 9/2007 | Hiramatsu et al. ............ 428/354 |

FOREIGN PATENT DOCUMENTS

| CN | 1667068 A | 9/2005 |
| EP | 1386950 A1 * | 2/2004 |
| EP | 1 491 604 A1 | 12/2004 |

(Continued)

OTHER PUBLICATIONS

Korean Office Action issued on Sep. 27, 2010 in the corresponding Korean Patent Application No. 10-2007-0017012.

(Continued)

*Primary Examiner* — Callie Shosho
*Assistant Examiner* — Samir Shah
(74) *Attorney, Agent, or Firm* — Sughrue Mion, PLLC

(57) ABSTRACT

The present invention relates to a pressure-sensitive adhesive tape or sheet having a light-reflective property and/or a light-shielding property, which includes a base material and at least one pressure-sensitive adhesive layer disposed on at least one surface of the base material. The pressure-sensitive adhesive layer is formed by an acrylic pressure-sensitive adhesive composition containing an acrylic polymer (a) and a low-molecular weight polymer component (b) which contains, as a principal monomer component, an ethylenic unsaturated monomer having a glass transition temperature of from 60 to 190° C. when it is formed into a homopolymer and having a cyclic structure within the molecule thereof, and which has a weight-average molecular weight equal to or higher than 3,000 but lower than 20,000. The pressure-sensitive adhesive layer has a gel fraction of from 51 to 75 wt % and a temperature, at a maximum of loss tangent (tan δ), of from −14 to 25° C.

7 Claims, 3 Drawing Sheets

(56) References Cited

FOREIGN PATENT DOCUMENTS

| | | |
|---|---|---|
| EP | 1 559 763 A1 | 8/2005 |
| EP | 1 574 577 A1 | 9/2005 |
| EP | 1574557 A1 * | 9/2005 |
| JP | 4-227674 A | 8/1992 |
| JP | 2001-72951 A | 3/2001 |
| JP | 2002-23663 A | 1/2002 |
| JP | 2002-235053 A | 8/2002 |
| JP | 2002-249741 A | 9/2002 |
| JP | 2002-350612 A | 12/2002 |
| JP | 2003-99749 A | 4/2003 |
| JP | 2004-53759 A | 2/2004 |
| JP | 2004-59723 A | 2/2004 |
| JP | 2004-156015 A | 6/2004 |
| JP | 2004-161955 A | 6/2004 |
| JP | 2004-184443 A | 7/2004 |
| JP | 2004-231736 A | 8/2004 |
| JP | 2004-231737 A | 8/2004 |
| JP | 2004-244499 A | 9/2004 |
| JP | 2005-15524 A | 1/2005 |
| JP | 2005-82775 A | 3/2005 |
| JP | 2005-213282 A | 8/2005 |
| JP | 2005-255877 A | 9/2005 |
| JP | 2005-263917 A | 9/2005 |
| JP | 2006-10931 A | 1/2006 |
| TW | 200504170 A | 2/2005 |
| TW | 200535212 A | 11/2005 |
| TW | 200536710 A | 11/2005 |

OTHER PUBLICATIONS

Chinese Office Action issued Mar. 17, 2011, in the corresponding Chinese Patent Application No. 20070005819.7.
Korean Office Action issued Sep. 28, 2011, in counterpart Korean Application No. 10-2007-0017012.
Taiwanese Office Action dated Jan. 11, 2012 issued by the Taiwanese Patent Office in corresponding Taiwanese Patent Application No. 096106365.
Japanese Office Action issued Mar. 27, 2012 by the Japanese Patent Office in counterpart Japanese Application No. 2006-333194.

* cited by examiner

PRESSURE-SENSITIVE ADHESIVE TAPE OR SHEET HAVING LIGHT-REFLECTIVE PROPERTY AND/OR LIGHT-SHIELDING PROPERTY, AND LIQUID CRYSTAL DISPLAY APPARATUS

FIELD OF THE INVENTION

The present invention relates to a pressure-sensitive adhesive tape or sheet having a light-reflective property and/or a light-shielding property, and to a liquid crystal display apparatus.

BACKGROUND OF THE INVENTION

In so-called "mobile phones" and the like, a liquid crystal display module unit for an image display and a backlight unit are fixed with each other by a pressure-sensitive adhesive tape or sheet, and a pressure-sensitive adhesive tape or sheet having a reflective property or a light-shielding property is used for such purpose (cf. Patent References 1 to 13).
Patent Reference 1: JP-A-2004-59723
Patent Reference 2: JP-A-2002-235053
Patent Reference 3: JP-A-2002-350612
Patent Reference 4: JP-A-2004-161955
Patent Reference 5: JP-A-2004-184443
Patent Reference 6: JP-A-2004-231736
Patent Reference 7: JP-A-2004-231737
Patent Reference 8: JP-A-2004-156015
Patent Reference 9: JP-A-2004-244499
Patent Reference 10: JP-A-2002-249741
Patent Reference 11: JP-A-2004-53759
Patent Reference 12: JP-A-2002-23663
Patent Reference 13: JP-A-2006-10931

SUMMARY OF THE INVENTION

As a conventional pressure-sensitive adhesive tape or sheet having a light-reflective property and/or a light-shielding property for use in fixing a liquid crystal display module unit and a backlight unit, employed commonly is a pressure-sensitive adhesive tape or sheet having a light-reflective property and/or a light-shielding property of a structure, which has a pressure-sensitive adhesive layer on at least a surface of a base material (on one surface or on both surfaces) and has a reflective layer and/or a light-shielding layer (such tape or sheet being also called "light-reflective/shielding pressure-sensitive adhesive tape or sheet"). Since the backlight unit is commonly formed with a polycarbonate substrate, the light-reflective/shielding pressure-sensitive adhesive tape or sheet, when adhered to the backlight unit, is normally adhered to the surface of the polycarbonate substrate of the backlight unit.

Further, the liquid crystal display module is connected to a flexible printed circuit (FPC), which is ordinarily used, in so-called mobile phone or the like, in a bent state. Consequently, the liquid crystal display module or the backlight unit is subjected to a repulsive force by the bending of FPC, so that the light-reflective/shielding pressure-sensitive adhesive tape or sheet is liable to be peeled. Therefore, a light-reflective/shielding pressure-sensitive adhesive tape or sheet having a pressure-sensitive adhesive layer containing a rather high amount of a crosslinking agent and having a high crosslinking density is utilized for increasing the resistance to the repulse force.

However, the polycarbonate substrate in the backlight unit contains absorbed moisture as it is made of polycarbonate resin, and, with the lapse of time (particularly under a high temperature), may release air (out-gassing) which presumably results from the absorbed moisture or from the remaining monomer component and which causes bubble formation. Therefore, when the light-reflective/shielding pressure-sensitive adhesive tape or sheet is adhered on the polycarbonate substrate, a separation or a peeling occurs with the lapse of time at the adhering interface between the polycarbonate substrate and the light-reflective/shielding pressure-sensitive adhesive tape or sheet by bubbles (foaming) generated from the polycarbonate substrate. When such separation or peeling occurs, the light-reflective/shielding pressure-sensitive adhesive tape or sheet is eventually peeled off from the backlight unit as the repulsive force by the bent FPC is also exerted.

Further, in case of containing the liquid crystal display module and the backlight unit in a casing, a clearance between both units and the casing is only about 0.3 mm, and, for example, when the mobile phone is accidentally dropped, the liquid crystal display module may be displaced and may come into contact with the casing when the pressure-sensitive adhesive layer is soft, thus resulting in a detriment that a glass substrate of the liquid crystal display is cracked by the impact. Therefore, as a double-faced pressure-sensitive adhesive tape satisfactory in a drop impact resistance and a repulsion resistance, there is disclosed a double-faced pressure-sensitive adhesive tape including a pressure-sensitive adhesive layer having a maximum of loss tangent within a temperature range of from $-40$ to $-15°$ C. and a pressure-sensitive adhesive layer having a gel fraction of from 15 to 45% (JP-A-2006-10931). However, such maximum temperature of loss tangent and gel fraction still involve drawbacks that the pressure-sensitive adhesive layer does not have a sufficient cohesive force, and, in the repulsion resistance, the pressure-sensitive adhesive may be stretched to cause a separation or a peeling, leading to a large displacement amount in case of a dropping. Particularly, the large displacement amount in case of a dropping brings about a problem in practical use, for example when a mobile phone or the like is accidentally dropped, that a glass substrate constituting the liquid crystal display module (also called "liquid crystal display glass") is easily cracked, thus leading to a deteriorated reliability of the product.

Therefore, a pressure-sensitive adhesive tape or sheet capable of solving these drawbacks has been desired.

In consideration of the foregoing, an object of the present invention is to provide a pressure-sensitive adhesive tape or sheet having a light-reflective property and/or a light-shielding property, capable of maintaining an excellent repulsion resistance, capable of suppressing or preventing a separation or a peeling when adhered to a polycarbonate substrate, and capable of suppressing or preventing a cracking in the liquid crystal display glass in case of a dropping; and to provide a liquid crystal display apparatus utilizing such pressure-sensitive adhesive tape or sheet having a light-reflective property and/or a light-shielding property.

As a result of intensive investigations undertaken by the present inventors, it is found possible, by employing a pressure-sensitive adhesive composition containing a specified low-molecular weight polymer component as the pressure-sensitive adhesive composition for forming a pressure-sensitive adhesive layer to be adhered to the polycarbonate substrate and by forming the pressure-sensitive adhesive layer so as to have a specified gel fraction and a maximum temperature of loss tangent, to maintain an excellent repulsion resistance, to suppress or prevent a separation or a peeling when adhered to the polycarbonate substrate, and to suppress or present a cracking in the liquid crystal display glass in a dropping when adhered to the liquid crystal display glass. The present invention has been made based on these findings.

BRIEF DESCRIPTION OF DRAWINGS

FIGS. 1A and 1B are schematic views illustrating a method for evaluating the repulsion resistance, used in evaluating the repulsion resistance of Examples, in which FIG. 1A is a schematic plan view illustrating a state where a polycarbonate plate and a double-faced pressure-sensitive adhesive tape or sheet are adhered to an FPC, and FIG. 1B is a schematic lateral view of FIG. 1A.

FIGS. 3A and 3B are schematic views illustrating the method for evaluating the displacement resistance, used in evaluating the displacement resistance of Examples, in which FIG. 3A is a schematic plan view illustrating a test sample formed by adhering a polycarbonate plate by a double-faced pressure-sensitive adhesive tape of a sample to the polycarbonate plate, and FIG. 3B is a schematic cross-sectional view of FIG. 3A.

DESCRIPTION OF SYMBOLS

Figure 1A:
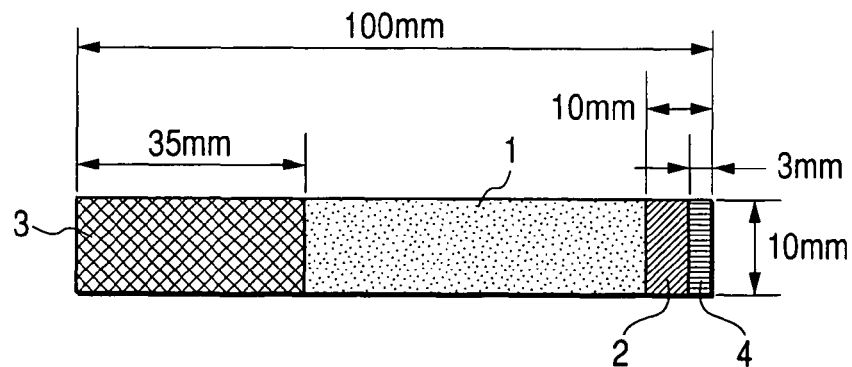

| | Description of Symbols |
|---|---|
| 1 | FPC |
| 2 | polyethylene terephthalate film |
| 3 | polycarbonate plate |
| 4 | sample of double-faced pressure-sensitive adhesive tape or sheet |
| 5 | polycarbonate plate |
| 6 | metal plate |
| 7 | sample of double-faced pressure-sensitive adhesive tape or sheet |
| 8 | glass plate |
| 9 | polyethylene terephthalate film |
| 10 | polycarbonate plate (stopping plate) |
| 11 | marble |

DETAILED DESCRIPTION OF THE INVENTION

Namely, the present invention relates to the following (1) to (5).

(1) A pressure-sensitive adhesive tape or sheet having a light-reflective property and/or a light-shielding property, which comprises:

a base material; and at least one pressure-sensitive adhesive layer disposed on at least one surface of the base material, said pressure-sensitive adhesive layer being formed by an acrylic pressure-sensitive adhesive composition containing an acrylic polymer (a) and a low-molecular weight polymer component (b) which contains, as a principal monomer component, an ethylenic unsaturated monomer having a glass transition temperature of from 60 to 190° C. when it is formed into a homopolymer and having a cyclic structure within the molecule thereof, and which has a weight-average molecular weight equal to or higher than 3,000 but lower than 20,000, wherein the pressure-sensitive adhesive layer has a gel fraction of from 51 to 75 wt % and a temperature, at a maximum of loss tangent (tan δ), of from −14 to 25° C., and wherein the pressure-sensitive adhesive tape or sheet has a reflectance of 60% or higher on at least one surface thereof and/or a transmittance of 0.3% or lower.

(2) The pressure-sensitive adhesive tape or sheet according to (1), wherein, in the acrylic pressure-sensitive adhesive composition, the low-molecular weight polymer component (b) is present in a proportion of from 10 to 35 parts by weight with respect to 100 parts by weight of the acrylic polymer (a).

(3) The pressure-sensitive adhesive tape or sheet according to (1), which has a reflective layer for providing a reflectance of 60% or higher on at least one surface of the pressure-sensitive adhesive tape or sheet, said reflective layer being a white-colored layer having a white color or a silver-colored layer having a silver color, wherein the reflective layer is the base material, the pressure-sensitive adhesive layer, or an optional layer other than the base material and the pressure-sensitive adhesive layer.

(4) The pressure-sensitive adhesive tape or sheet according to (1), which has a light-shielding layer for providing a transmittance of 0.3% or lower, said light-shielding layer being a black-colored layer having a black color, wherein the light-shielding layer is the base material, the pressure-sensitive adhesive layer, or an optional layer other than the base material and the pressure-sensitive adhesive layer.

(5) The pressure-sensitive adhesive tape or sheet according (1), which is for use in fixing a liquid crystal display module unit and a backlight unit.

In the acrylic pressure-sensitive adhesive composition, the low-molecular weight polymer component (b) is preferably present in a proportion of from 10 to 35 parts by weight with respect to 100 parts by weight of the acrylic polymer (a).

Further, as a reflective layer for providing a reflectance of 60% or higher on at least one surface of the pressure-sensitive adhesive tape or sheet, a white-colored layer having a white color or a silver-colored layer having a silver color can be employed advantageously, and as a light-shielding layer for providing a transmittance of 0.3% or lower, a black-colored layer having a black color can be employed advantageously.

Such pressure-sensitive adhesive tape or sheet having a light-reflective property and/or a light-shielding property can be employed advantageously for fixing a liquid crystal display module and a backlight unit.

Further, the present invention also relates to the following (6) to (7).

(6) A liquid crystal display apparatus, comprising:

a liquid crystal display module unit;

a backlight unit, and the pressure-sensitive adhesive tape or sheet according to claim 1, which fixes the liquid crystal display module unit and the backlight unit.

(7) The liquid crystal display apparatus according to (6), wherein the backlight unit has a polycarbonate substrate, and wherein the pressure-sensitive adhesive tape or sheet is used in such a form that the pressure-sensitive adhesive layer formed by the acrylic pressure-sensitive adhesive composition containing the acrylic polymer (a) and the low-molecular weight polymer component (b) is in contact with the polycarbonate substrate of the backlight unit.

In such liquid crystal display apparatus, it is preferable that the backlight unit includes a polycarbonate substrate, and the pressure-sensitive adhesive tape or sheet having a light-reflective property and/or a light-shielding property is preferably used in such a form that the pressure-sensitive adhesive layer formed by the acrylic pressure-sensitive adhesive composition containing the acrylic polymer (a) and the low-molecular weight polymer component (b) is in contact with the polycarbonate substrate of the backlight unit.

The pressure-sensitive adhesive tape or sheet having a light-reflective property and/or a light-shielding property of the present invention, having the aforementioned constitution, is capable of maintaining an excellent repulsion resistance, capable of suppressing or preventing a separation or a peeling when adhered to a polycarbonate substrate, and capable of suppressing or preventing a cracking in the liquid crystal display glass in case of a dropping.

The light-reflective/shielding pressure-sensitive adhesive tape or sheet (pressure-sensitive adhesive tape or sheet having a light-reflective property and/or a light-shielding property) of the present invention is characterized in including a pressure-sensitive adhesive layer on at least one surface of a base material, in having characteristics that at least one surface thereof has a reflectance of 60% or higher and/or a transmittance of 0.3% or lower, in that the pressure-sensitive adhesive layer disposed on at least one surface of the base material is formed by an acrylic pressure-sensitive adhesive composition containing an acrylic polymer (a) and a low-molecular weight polymer component (b) which contains, as a principal monomer component, an ethylenic unsaturated monomer having a glass transition temperature of from 60 to 190° C. when it is formed into a homopolymer and having a cyclic structure within the molecule thereof, and which has a weight-average molecular weight equal to or higher than 3,000 but lower than 20,000, and in that the pressure-sensitive adhesive layer has a gel fraction of from 51 to 75 wt % and a temperature, at a maximum of loss tangent (tan δ), of from −14 to 25° C.

Thus the light-reflective/shielding pressure-sensitive adhesive tape or sheet is provided with a pressure-sensitive adhesive layer, that is formed by an acrylic pressure-sensitive adhesive composition containing, together with an acrylic polymer (a), a low-molecular weight polymer component (b) which contains, as a principal monomer component, an ethylenic unsaturated monomer having a glass transition temperature of from 60 to 190° C. when it is formed into a homopolymer and having a cyclic structure within the molecule thereof, and which has a weight-average molecular weight equal to or higher than 3,000 but lower than 20,000, and that has a gel fraction of from 51 to 75 wt % and a temperature, at a maximum of loss tangent (tan δ), of from −14 to 25° C. (such pressure-sensitive adhesive layer being also referred to as "low-molecular weight polymer-containing pressure-sensitive adhesive layer"). Therefore, when such low-molecular weight polymer-containing pressure-sensitive adhesive layer is adhered to the polycarbonate substrate, the tape or sheet can effectively suppress or prevent a separation or a peeling at the interface between the low-molecular weight polymer-containing pressure-sensitive adhesive layer and the polycarbonate substrate because of an improved adhesion to the polycarbonate substrate, and can exhibit an excellent repulsion resistance. Besides, the low-molecular weight polymer-containing pressure-sensitive adhesive layer has a high cohesive power, and, when adhered to a liquid crystal display glass, it can firmly hold the liquid crystal display glass even in case of dropping, to suppress or prevent a displacement thereof, thereby effectively suppressing or preventing the cracking in the liquid crystal display glass in case of dropping.

In the present invention, in the case that the light-reflective/shielding pressure-sensitive adhesive tape or sheet has a property having a reflectance of 60% or higher on at least one surface thereof, the reflectance of the surface having a reflectance of 60% or higher is not particularly restricted as long as it is 60% or higher (for example from 60 to 100%), but the higher the more preferable. In the light-reflective/shielding pressure-sensitive adhesive tape or sheet, the reflectance of the surface having a reflectance of 60% or higher is preferably 70% or higher and more preferably 80% or higher. In the case that the light-reflective/shielding pressure-sensitive adhesive tape or sheet has a property having a reflectance of 60% or higher on both surfaces, the reflectances of the surfaces may be same or different each other.

In the light-reflective/shielding pressure-sensitive adhesive tape or sheet, the reflectance (diffuse reflectance) of a predetermined surface can be determined, utilizing a spectrophotometer MPS-2000 manufactured by Shimadzu Corp., by irradiating a surface (predetermined surface side) of the light-reflective/shielding pressure-sensitive adhesive tape or sheet with a light of a wavelength of 550 nm and measuring an intensity of a light reflected from the irradiated surface.

Also, in the case that the light-reflective/shielding pressure-sensitive adhesive tape or sheet has a property having a transmittance of 0.3% or lower, the transmittance of the light-reflective/shielding pressure-sensitive adhesive tape or sheet is not particularly restricted as long as it is 0.3% or lower (from 0 to 0.3%), but the lower the more preferable. In the light-reflective/shielding pressure-sensitive adhesive tape or sheet, the transmittance is preferably 0.1% or lower, more preferably 0.05% or lower and particularly preferably 0.01% or lower.

The transmittance of the light-reflective/shielding pressure-sensitive adhesive tape or sheet can be determined, with a spectrophotometer U4100 manufactured by Hitachi Ltd., by irradiating a surface of the light-reflective/shielding pressure-sensitive adhesive tape or sheet with a light of a wavelength of 550 nm, and measuring an intensity of a light transmitted to the other surface.

In the light-reflective/shielding pressure-sensitive adhesive tape or sheet of the invention, it is important that the low-molecular weight polymer-containing pressure-sensitive adhesive layer is formed on at least one surface (one surface or both surfaces) of the base material. Therefore, in the case that the light-reflective/shielding pressure-sensitive adhesive tape or sheet has the pressure-sensitive adhesive layer on only one surface of the base material, such pressure-sensitive adhesive layer formed on one surface of the base material is formed as the low-molecular weight polymer-containing pressure-sensitive adhesive layer. Also, in the case that the light-reflective/shielding pressure-sensitive adhesive tape or sheet has pressure-sensitive adhesive layers on both surfaces of the base material (namely in a case of a form of a double-faced pressure-sensitive adhesive tape or sheet), the pressure-sensitive adhesive layer formed on one surface of the base material is formed as the low-molecular weight polymer-containing pressure-sensitive adhesive layer, while the pressure-sensitive adhesive layer formed on the other surface of the base material may be formed as a pressure-sensitive adhesive layer other than the low-molecular weight polymer-containing pressure-sensitive adhesive layer (such pressure-sensitive adhesive layer being referred also as "low-molecular weight polymer-free pressure-sensitive adhesive layer", or the pressure-sensitive adhesive layers formed on both surface of the base material may be both formed as low-molecular weight polymer-containing pressure-sensitive adhesive layers.

Each pressure-sensitive adhesive layer such as a low-molecular weight polymer-containing pressure-sensitive adhesive layer or a low-molecular weight polymer-free pressure-sensitive adhesive layer may be a transparent pressure-sensitive adhesive layer, or a pressure-sensitive adhesive layer having a light-shielding property (light-shielding pressure-sensitive adhesive layer) or a pressure-sensitive adhesive layer having a light-reflective property (light-reflective pressure-sensitive adhesive layer). In the case that each pressure-sensitive adhesive layer is a black-color layer as a light-shielding layer (light-shielding pressure-sensitive adhesive layer), or a white-color layer or a silver-color layer as a reflective layer (light-reflective pressure-sensitive adhesive layer), it may contain a colorant (for example, a black colorant, a white colorant or a silver colorant), corresponding to the represented color. More specifically, for example, a light-shielding pressure-sensitive adhesive layer (a low-molecular weight polymer-containing pressure-sensitive adhesive layer having a light-shielding property (also called "light-shielding low-molecular weight polymer-containing pressure-sensitive adhesive layer") or a low-molecular weight polymer-free pressure-sensitive adhesive layer having a light-shielding property (also called "light-shielding low-molecular weight polymer-free pressure-sensitive adhesive layer")) may contain a black colorant. Such black colorant may be suitably selected among the black colorants described as examples for the light-shielding layer. Also, for example a light-reflective pressure-sensitive adhesive layer (low-molecular weight polymer-containing pressure-sensitive adhesive layer having a light-reflective property (also called "light-reflective low-molecular weight polymer-containing pressure-sensitive adhesive layer") or a low-molecular weight polymer-free pressure-sensitive adhesive layer having a light-shielding property (also called "light-reflective low-molecular weight polymer-free pressure-sensitive adhesive layer")) may contain a white colorant or a silver colorant, and such white colorant or silver colorant may be suitably selected among the white colorants and silver colorants described as examples for the reflective layer.

Further, in the case that each pressure-sensitive adhesive layer such as a low-molecular weight polymer-containing pressure-sensitive adhesive layer or a low-molecular weight polymer-free pressure-sensitive adhesive layer is not a black-color layer as a light-shielding layer (light-shielding pressure-sensitive adhesive layer) nor a white-color layer or a silver-color layer as a light-reflective layer (light-reflective pressure-sensitive adhesive layer), a pressure-sensitive adhesive layer having a transparency (also called "transparent pressure-sensitive adhesive layer") may be employed advantageously.

As the light-reflective/shielding pressure-sensitive adhesive tape or sheet of the present invention is employed in fixing a liquid crystal display module and a backlight unit in electronic equipment such as so-called mobile phones and the like, each pressure-sensitive adhesive layer such as the low-molecular weight polymer-containing pressure-sensitive adhesive layer or the low-molecular weight polymer-free pressure-sensitive adhesive layer is preferably electrically non-conductive, for the purpose of suppressing or preventing an electrical damages to the electronic equipment. For this reason, the colorant to be contained in the pressure-sensitive adhesive layer is preferably electrically non-conductive. As the colorant electrically non-conductive, non-conductive one can be suitably selected among various colorants described as examples for the reflective layer and the light-shielding layer described below. For example, a pressure-sensitive adhesive layer having a non-conductive property and a light-shielding property can be formed by not employing a black colorant having an electrical conductivity such as carbon black but by employing a black colorant, formed by a mixture of a cyan colorant, a magenta colorant and a yellow colorant.

Low-Molecular Weight Polymer-Containing Pressure-Sensitive Adhesive Layer

The low-molecular weight polymer-containing pressure-sensitive adhesive layer is formed by an acrylic pressure-sensitive adhesive composition containing an acrylic polymer (a) and a low-molecular weight polymer component (b) which contains, as a principal monomer component, an ethylenic unsaturated monomer having a glass transition temperature of from 60 to 190° C. when it is formed into a homopolymer and having a cyclic structure within the molecule thereof, and which has a weight-average molecular weight equal to or higher than 3,000 but lower than 20,000. The acrylic pressure-sensitive adhesive composition may be employed singly or in a combination of two or more kinds. Also, the acrylic pressure-sensitive adhesive composition may be a pressure-sensitive adhesive of any form, such as an emulsion type pressure-sensitive adhesive, a solvent type pressure-sensitive adhesive or a hot-melt type pressure-sensitive adhesive.

Acrylic Polymer (a)

In the acrylic pressure-sensitive adhesive composition for forming the low-molecular weight polymer-containing pressure-sensitive adhesive layer, the acrylic polymer (a) can be a (meth)acrylic acid ester type polymer containing a (meth) acrylic acid ester (acrylic acid ester or methacrylic acid ester) as a principal monomer component. Examples of such (meth) acrylic acid ester include not only (meth)acrylic acid alkyl esters shown below but also (meth)acrylic acid cycloalkyl esters such as cyclohexyl(meth)acrylate and (meth)acrylic acid aryl esters such as phenyl (meth)acrylate. The (meth) acrylic acid ester as the principal monomer component may be employed singly or in a combination of two or more kinds.

In the acrylic polymer (a), a (meth)acrylic alkyl acid ester can be employed advantageously as the (meth)acrylic acid ester constituting the principal monomer component. Thus, as the (a) acrylic polymer, a (meth)acrylic acid alkyl ester type polymer, employing a (meth)acrylic acid alkyl ester as the principal monomer component, can be employed advantageously.

The acrylic polymer (a) preferably employs a (meth) acrylic acid alkyl ester, containing 4 to 12 carbon atoms in the alkyl group, as the principal monomer component, and examples of such (meth)acrylic acid alkyl ester containing 4 to 12 carbon atoms in the alkyl group include n-butyl(meth) acrylate, isobutyl(meth)acrylate, sec-butyl(meth)acrylate, t-butyl(meth)acrylate, pentyl(meth)acrylate, isopentyl (meth)acrylate, neopentyl(meth)acrylate, hexyl(meth)acrylate, heptyl(meth)acrylate, octyl(meth)acrylate, isooctyl (meth)acrylate, 2-ethylhexyl(meth)acrylate, nonyl (meth) acrylate, isononyl(meth)acrylate, decyl(meth)acrylate, isodecyl(meth)acrylate, undecyl(meth)acrylate, and dodecyl (meth)acrylate. The (meth)acrylic acid alkyl ester containing 4 to 12 carbon atoms in the alkyl group may be employed singly or in a combination of two or more kinds.

In the acrylic polymer (a), (meth)acrylic acid ester such as (meth)acrylic acid alkyl ester (particularly (meth)acrylic acid alkyl ester containing 4 to 12 carbon atoms in the alkyl group), being employed as the principal monomer component, importantly has a proportion of 50 wt % or higher, preferably 80 wt % or higher and more preferably 90 wt % or higher, with respect to the total amount of monomers. Also an upper limit of the proportion of the (meth)acrylic acid ester with respect to the total amount of monomers is not particularly restricted, but is desirably 99 wt % or less (preferably 98 wt % or less and more preferably 97 wt % or less). A proportion of the (meth)acrylic acid ester (particularly (meth)acrylic acid alkyl ester containing 4 to 12 carbon atoms in the alkyl group) less than 50 wt % with respect to the total amount of monomers may be difficult to exhibit the characteristics (such as pressure-sensitive adhesive property) of the acrylic polymer.

The acrylic polymer (a) may utilize, as a monomer component, a monomer component capable of copolymerization (copolymerizable monomer) with (meth)acrylic acid ester. The copolymerizable monomer may be used for introducing a crosslinking site into the acrylic polymer (a) or for controlling the cohesive power of the acrylic polymer (a). The copolymerizable monomer may be employed singly or in a combination of two or more kinds.

More specifically, as the copolymerizable monomer, for the purpose of introducing a crosslinking site into the acrylic polymer (a), a functional group-containing monomer component (particularly a thermally crosslinking functional group-containing monomer component for introducing a thermal crosslinking site into the acrylic polymer (a)) can be employed. Such functional group-containing monomer component may be, without particular restriction, any monomer component that can copolymerize with (meth)acrylic acid alkyl ester and that has a functional group providing a crosslinking site, and examples thereof include carboxyl group-containing monomers such as (meth)acrylic acid, itaconic acid, crotonic acid, maleic acid, fumaric acid, and isocrotonic acid, and anhydride thereof (such as maleic anhydride and itaconic anhydride); hydroxyalkyl(meth)acrylates such as 2-hydroxyethyl(meth)acrylate, and 2-hydroxypropyl (meth)acrylate; hydroxyl group-containing monomers such as vinyl alcohol and allyl alcohol; amide type monomers such as (meth)acrylamide, N,N-dimethyl(meth)acrylamide, N-butyl(meth)acrylamide, N-methyrol (meth)acrylamide, N-methyrolpropane (meth)acrylamide, N-methoxymethyl(meth) acrylamide, and N-butoxymethyl (meth)acrylamide; amino group-containing monomers such as aminoethyl(meth)acrylate, N,N-dimethylaminoethyl(meth)acrylate, and t-butylaminoethyl (meth)acrylate; epoxy group-containing monomers such as glycidyl (meth)acrylate, and methylglycidyl (meth)acrylate; cyano group-containing monomers such as acrylonitrile and methacrylonitrile; and monomers having a nitrogen-containing ring, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine. As the functional group-containing monomer, a carboxyl group-containing monomer such as acrylic acid or an acid anhydride thereof can be employed advantageously.

Also as the copolymerizable monomer, another copolymerizable monomer component may be employed for the purpose of controlling the cohesive power of the acrylic polymer (a). Examples of such another copolymerizable monomer component include vinyl ester type monomers such as vinyl acetate and vinyl propionate; styrene type monomers such as styrene, a substituted styrene (such as α-methyl styrene), and vinyltoluene; non-aromatic ring-containing (meth)acrylic acid esters such as a (meth)acrylic acid cycloalkyl ester (such as cyclohexyl(meth)acrylate or cyclopentyl di(meth)acrylate), bornyl(meth)acrylate, and isobornyl (meth)acrylate; aromatic ring-containing (meth)acrylic acid esters such as a (meth)acrylic acid aryl ester (such as phenyl (meth)acrylate), a (meth)acrylic acid aryloyalkyl ester (such as phenoxyethyl (meth)acrylate), and a (meth)acrylic acid arylalkyl ester (such as benzyl(meth)acrylate); olefinic monomers such as ethylene, propylene, isoprene, butadiene and isobutylene; vinyl chloride, vinylidene chloride; isocyanate group-containing monomers such as 2-(meth)acryloyloxyethylisocyanate; alkoxy group-containing monomers such as methoxyethyl(meth)acrylate and ethoxyethyl(meth) acrylate; vinyl ether type monomers such as methyl vinyl ether, and ethyl vinyl ether; and polyfunctional monomers such as 1,6-hexanediol di(meth)acrylate, ethylene glycol di(meth)acrylate, diethylene glycol di(meth)acrylate, triethylene glycol di(meth)acrylate, tetraethylene glycol di(meth) acrylate, (poly)ethylene glycol di(meth)acrylate, propylene glycol di(meth)acrylate, (poly)propylene glycol di(meth) acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth) acrylate, glycerin di(meth)acrylate, epoxy acrylate, polyester acrylate, urethane acrylate, divinylbenzene, butyl di(meth) acrylate, and hexyl di(meth)acrylate.

In case of utilizing a (meth)acrylic acid alkyl ester containing 4 to 12 carbon atoms in the alkyl group as the principal monomer component, employable another copolymerizable monomer component can be, for example, a (meth)acrylic acid $C_{1-3}$ alkyl ester such as methyl(meth)acrylate, ethyl (meth)acrylate, propyl(meth)acrylate or isopropyl(meth) acrylate; a (meth)acrylic acid $C_{13-20}$ alkyl ester such as tridecyl (meth)acrylate, tetradecyl(meth)acrylate, pentadecyl (meth)acrylate, hexadecyl (meth)acrylate, heptadecyl(meth) acrylate, octadecyl(meth)acrylate, nonadecyl (meth)acrylate, or eicosyl(meth)acrylate; a non-aromatic ring-containing (meth)acrylic acid ester such as a (meth)acrylic acid cycloalkyl ester (such as cyclohexyl (meth)acrylate) or isobornyl(meth)acrylate; or an aromatic ring-containing (meth)acrylic acid ester such as (meth)acrylic acid aryl ester (such as phenyl (meth)acrylate), (meth)acrylic acid aryloxyalkyl ester (such as phenoxyethyl (meth)acrylate), or (meth) acrylic acid arylalkyl ester (such as benzyl(meth)acrylate).

As the copolymerizable monomer in the acrylic polymer (a), a carboxyl group-containing monomer is preferable, and acrylic acid is particularly preferable.

The acrylic polymer (a) can be prepared by a conventional or common polymerization method. Examples of the polymerization method for the acrylic polymer (a) include a solution polymerization, an emulsion polymerization, a block polymerization, and a polymerization under ultraviolet irradiation. In the polymerization of the acrylic polymer (a), suitable components matching each polymerization method, such as a polymerization initiator, a chain transfer agent, an emulsifier and a solvent, may be suitably selected and used among those conventionally or commonly used.

A weight-average molecular weight of the acrylic polymer (a) can be suitably selected within a range of from 500,000 to 1,500,000 (preferably from 550,000 to 1,200,000 and more preferably from 600,000 to 1,000,000). A weight-average molecular weight of the acrylic polymer (a) less than 500,000 may be unable to exhibit a satisfactory pressure-sensitive adhesive property, and that exceeding 1,500,000 may cause a difficulty in the coating property, thus either being undesirable.

The weight-average molecular weight of the acrylic polymer (a) can be controlled by a type and an amount of the polymerization initiator and the chain transfer agent, a temperature and a time of polymerization, and a concentration and an addition speed of the monomer.

In the invention, the weight-average molecular weight of the acrylic polymer (a) was measured under following measuring conditions:

apparatus used: HLC-8120GPC, manufactured by Tosoh Corp.

column: TSK gel Super HZM-H/HZ4000/HZ3000/HZ2000, manufactured by Tosoh Corp.

pressure at inlet: 7.2 MPa column size: 6.0 mmφ×15 cm each, 60 cm in total column temperature: 40° C.

eluting liquid: tetrahydrofuran (THF)

flow rate: flow speed 6.0 mL/min sample concentration: 0.1 wt % (tetrahydrofuran solution)

sample injection amount: 20 μL detector: differential refractometer (RI)

standard sample: polystyrene (PS)

data processing apparatus: GPC-8020, manufactured by Tosoh Corp.

Low-Molecular Weight Polymer Component (B)

In the acrylic pressure-sensitive adhesive composition for forming the low-molecular weight polymer-containing pressure-sensitive adhesive layer, the low-molecular weight polymer component (b) contains, as a principal monomer component, an ethylenic unsaturated monomer having a glass transition temperature of from 60 to 190° C. when it is formed into a homopolymer and having a cyclic structure within a molecule [also called "ring-containing ethylenic unsaturated monomer having Tg of 60-190° C."]. In such ring-containing ethylenic unsaturated monomer having Tg of 60-190° C., a glass transition temperature (Tg) in forming a homopolymer is a value obtained in the following "Tg measuring method".

(Tg Measuring Method)

In a reaction equipped with a thermometer, an agitator, a nitrogen introducing tube and a reflux condenser, 100 parts by weight of a monomer component (namely ring-containing ethylenic unsaturated monomer having Tg of 60-190° C.), 0.2 parts by weight of azobisisobutyronitrile and 200 parts by weight of ethyl acetate as a polymerization solvent are charged, and agitated for 1 hour under a nitrogen gas introduction. After oxygen in the polymerization system is removed in this manner, the mixture is heated to 63° C. and reacted for 10 hours. Then it is cooled to the room temperature to obtain a homopolymer solution of a solid concentration of 33 wt %. Then the homopolymer solution is cast coated on a releasing liner and dried to obtain a test sample (sheet-shaped homopolymer) of a thickness of about 2 mm. The test sample is then punched into a disc shape of a diameter of 7.9 mm, then sandwiched between parallel plates and is subjected to a viscoelasticity measurement on a viscoelastic tester (ARES, manufactured by Rheometrics Inc.), in a shear mode, under a shearing strain of 1 Hz, within a temperature range of from −70 to 150° C. and at a temperature elevating rate of 5° C./min to determine a temperature at a maximum of loss tangent (tan δ), and such temperature at the maximum of loss tangent is taken as the glass transition temperature (Tg).

In the low-molecular weight polymer component (b), the ring-containing ethylenic unsaturated monomer having Tg of 60-190° C. may be, without any particular restriction, any ethylenic unsaturated monomer showing Tg of from 60 to 190° C. when it is formed as a homopolymer and having a cyclic structure within the molecule. The ring in such ring-containing ethylenic unsaturated monomer having Tg of 60-190° C. may be either one of an aromatic ring and a non-aromatic ring, but a non-aromatic ring is preferred. Examples of the aromatic ring include aromatic hydrocarbon rings (such as a benzene ring and a condensed carbon ring as in naphthalene), and various aromatic heterocycles. Also examples of the non-aromatic ring include non-aromatic alicyclic rings (for example cycloalkane rings such as a cyclopentane ring, a cyclohexane ring, a cycloheptane ring and a cyclooctane ring; or cycloalkene rings such as a cyclohexene ring), non-aromatic bridged rings (for example bridged hydrocarbon rings such as a bicyclic hydrocarbon ring as in pinane, pinene, bomane, norbornane, and norbornene; a tricyclic hydrocarbon ring as in adamantane and a tetracyclic hydrocarbon ring).

For such ring-containing ethylenic unsaturated monomer having Tg of 60-190° C., an ethylenic unsaturated monomer showing a glass transition temperature of 60° C. or higher (preferably from 60 to 190° C. and more preferably from 63 to 180° C.) when it is formed into a homopolymer may be suitably selected among those having a cyclic structure within the molecule thereof, of which examples include non-aromatic ring-containing (meth)acrylic acid esters for example (meth)acrylic acid cycloalkyl esters such as cyclohexyl (meth)acrylate, or isobornyl(meth)acrylate; aromatic ring-containing (meth)acrylic acid esters for example (meth) acrylic acid aryl esters such as phenyl(meth)acrylate, (meth) acrylic acid aryloxyalkyl esters such as phenoxyethyl (meth) acrylate, and (meth)acrylic acid arylalkyl esters such as benzyl(meth)acrylate; and styrenic monomers such as styrene or α-methylstyrene. Thus, an ethylenic unsaturated monomer having a cyclic structure, that can form a homopolymer having a glass transition temperature of 60° C. or higher (preferably from 60 to 190° C. and more preferably from 63 to 180° C.), can be utilized.

In the present invention, the ring-containing ethylenic unsaturated monomer having Tg of 60-190° C. is preferably a (meth)acrylic acid ester having a non-aromatic ring, such as cyclohexyl(meth)acrylate or isobornyl(meth)acrylate.

The ring-containing ethylenic unsaturated monomer having Tg of 60-190° C. as the principal monomer component may be employed singly or in a combination of two or more kinds.

In the low-molecular weight polymer component (b), the ring-containing ethylenic unsaturated monomer having Tg of 60-190° C., being employed as the principal monomer component, importantly has a proportion of 50 wt % or higher, preferably 80 wt % or higher and more preferably 90 wt % or higher, with respect to the total amount of monomers. When the proportion of the ring-containing ethylenic unsaturated monomer having Tg of 60-190° C. is less than 50 wt % with respect to the total amount of monomers, the repulsion resistance and the cohesive power are deteriorated.

In the low-molecular weight polymer component (b), a monomer component (copolymerizable monomer) capable of copolymerizing with the ring-containing ethylenic unsaturated monomer having Tg of 60-190° C. may be employed in combination, when necessitated. A proportion of such copolymerizable monomer may be suitably selected within a range less than 50 parts by weight with respect to 100 parts by weight of all the monomer components according to the type of the monomer components, but, in order to develop a satisfactory pressure-sensitive adhesive property, is preferably such an amount as to provide a glass transition temperature of 60° C. or higher (preferably from 65 to 180° C.) in the low-molecular weight polymer component (b). A glass transition temperature of the low-molecular weight polymer component (b) less than 60° C. reduces the repulsion resistance and the cohesive power.

Such copolymerizable monomer may be employed singly or in a combination of two or more kinds.

In the low-molecular weight polymer component (b), the copolymerizable monomer can be suitably selected for example from various monomer components described as examples in the acrylic polymer (a). Specific examples of such copolymerizable monomer include (meth)acrylic acid alkyl esters such as (meth)acrylic acid alkyl esters containing 1 to 20 carbon atoms; carboxyl group-containing monomers such as (meth)acrylic acid and acid anhydride thereof; hydroxyl group-containing monomers such as 2-hydroxyethyl(meth)acrylate; amide type monomers such as (meth) acrylamide; amino group-containing monomers such as N,N-dimethylaminoethyl (meth)acrylate; epoxy group-containing monomers such as glycidyl(meth)acrylate; cyano group-containing monomers such as acrylonitrile and methacrylonitrile; monomers having a nitrogen-containing ring, such as N-(meth)acryloylmorpholine; vinyl ester type monomers such as vinyl acetate; olefinic monomers such as ethylene, propylene, isoprene, butadiene and isobutylene; vinyl chloride, vinylidene chloride; isocyanate group-containing monomers such as 2-(meth)acryloyloxyethylisocyanate; alkoxy group-containing monomers such as methoxyethyl (meth)acrylate; vinyl ether type monomers such as methyl vinyl ether, and ethyl vinyl ether; and polyfunctional monomers such as 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, (poly)ethylene glycol di(meth)acrylate, propylene glycol di(meth)acrylate, (poly)propylene glycol di(meth)acrylate, neopentyl glycol di(meth)acrylate, pentaerythritol di(meth)acrylate, trimethylolpropane tri(meth) acrylate, pentaerythritol tri(meth)acrylate, dipentaerythritol hexa(meth)acrylate, glycerin di(meth)acrylate, epoxy acrylate, polyester acrylate, urethane acrylate, divinylbenzene, butyl di(meth)acrylate, and hexyl di(meth)acrylate.

As the copolymerizable monomer in the low-molecular weight polymer component (b), a carboxyl group-containing monomer is preferable, and acrylic acid is particularly preferable.

The low-molecular weight polymer component (b), like the acrylic polymer (a), can be prepared by a conventional or common polymerization method. Examples of the polymerization method for the low-molecular weight polymer component (b) include a solution polymerization, an emulsion polymerization, a block polymerization, and a polymerization under ultraviolet irradiation. In the polymerization of the low-molecular weight polymer component (b), suitable components matching each polymerization method, such as a polymerization initiator, a chain transfer agent, an emulsifier and a solvent, may be suitably selected and used among those conventionally or commonly used.

A weight-average molecular weight of the low-molecular weight polymer component (b) is importantly equal to or higher than 3,000 but less than 20,000, preferably from 3,050 to 15,000 and particularly preferably from 3,100 to 9,900. A weight-average molecular weight of the low-molecular weight polymer component (b) less than 3,000 reduces the repulsion resistance and the cohesive power, and that equal to or higher than 20,000 reduces a mutual solubility with the acrylic polymer (a) as the principal monomer component, thereby deteriorating the repulsion resistance and the cohesive power.

The weight-average molecular weight of the low-molecular weight polymer component (b) can be controlled by a type and an amount of the polymerization initiator and the chain transfer agent, a temperature and a time of polymerization, and a concentration and an addition speed of the monomers.

In the invention, the weight-average molecular weight of the low-molecular weight polymer component (b) was measured under conditions similar to those for the acrylic polymer (a) (under following measuring conditions):

apparatus used: BLC-8120GPC, manufactured by Tosoh Corp.
column: TSK gel Super HZM-H/HZ4000/HZ3000/HZ2000, manufactured by Tosoh Corp.
pressure at inlet: 7.2 MPa
column size: 6.0 mmϕ×15 cm each, 60 cm in total
column temperature: 40° C.
eluting liquid: tetrahydrofuran (THF)
flow rate: flow speed 6.0 mL/min
sample concentration: 0.1 wt % (tetrahydrofuran solution)
sample injection amount: 20 μL
detector: differential refractometer (RI)
standard sample: polystyrene (PS)
data processing apparatus: GPC-8020, manufactured by Tosoh Corp.

In the acrylic pressure-sensitive adhesive composition for forming the low-molecular weight polymer-containing pressure-sensitive adhesive layer, the proportion of the low-molecular weight polymer component (b) is not particularly restricted, but can be suitably selected within a range of from 10 to 35 parts by weight (preferably from 12 to 33 parts by weight and more preferably from 15 to 30 parts by weight) with respect to 100 parts by weight of the acrylic polymer (a). An amount of the low-molecular weight polymer component (b) less than 10 parts by weight with respect to 100 parts by weight of the acrylic polymer (a) reduces the repulsion resistance and the cohesive power, and an amount exceeding 35 parts by weight with respect to 100 parts by weight of the acrylic polymer (a) results in an excessively high cohesive power to reduce the pressure-sensitive adhesive power, thus either case being undesirable.

The acrylic pressure-sensitive adhesive composition for forming the low-molecular weight polymer-containing pressure-sensitive adhesive layer may contain, in addition to the acrylic polymer (a) and the low-molecular weight polymer component (b), various additives according to the necessity. Such additives may be suitably selected from conventional additives such as a crosslinking agent, a cross bonding agent, a pressure-sensitive adhesive property providing resin, a filler, a flame retardant, an antiaging agent, an antistatic, a softener, an ultraviolet absorber, an antioxidant, a plasticizer, and a surfactant.

Particularly, in the invention, a crosslinking agent is preferably employed from the standpoint of repulsion resistance. The amount of the crosslinking agent is not particularly restricted and may be suitably selected according to a crosslinking density desired in the low-molecular weight polymer-containing pressure-sensitive adhesive layer, a type of the crosslinking agent, and a type (composition and weight-average molecular weight) of the acrylic polymer (a), and is importantly such an amount that the low-molecular weight polymer-containing pressure-sensitive adhesive layer can exhibit an excellent repulsion resistance. More specifically, the amount of the crosslinking agent can be selected for example within a range of from 0.01 to 20 parts by weight (preferably from 0.02 to 10 parts by weight) with respect to 100 parts by weight of the acrylic polymer (a).

The crosslinking agent is not particularly restricted, and may be suitably selected from conventional crosslinking agents, and examples thereof include an isocyanate type crosslinking agent, a melamine type crosslinking agent, an epoxy type crosslinking agent, a peroxide type crosslinking agent, an urea type crosslinking agent, a metal alkoxide type crosslinking agent, a metal chelate type crosslinking agent, a metal salt type crosslinking agent, a carbodiimide type crosslinking agent, an oxazoline type crosslinking agent, an aziridine type crosslinking agent, and an amine type crosslinking agent, and an isocyanate type crosslinking agent or an epoxy type crosslinking agent may be employed advantageously. The crosslinking agent may be employed singly or in a combination of two or more kinds.

Examples of the isocyanate type crosslinking agent include lower aliphatic polyisocyanates such as 1,2-ethylene diisocyanate, 1,4-butylene diisocyanate and 1,6-hexamethylene diisocyanate; alicyclic polyisocyanates such as cyclopentylene diisocyanate, cyclohexylene diisocyanate, isophorone diisocyanate, hydrogenated tolylene diisocyanate, and hydrogenated xylene diisocyanate; and aromatic polyisocyanates such as 2,4-tolylene diisocyanate, 2,6-tolylene diisocyanate, 4,4'-diphenylmethane diisocyanate, and xylylene diisocyanate, and a trimethyrol propane/tolylene diisocyanate trimer addition product (Coronate L (trade name), manufactured by Nippon Polyurethane Industry Co.) and a trimethyrol propane/hexamethylene diisocyanate trimer addition product (Coronate HL (trade name), manufactured by Nippon Polyurethane Industry Co.) are also usable.

Also, examples of the epoxy type crosslinking agent include N,N,N',N'-tetraglycidyl-m-xylenediamine, diglycidylaniline, 1,3-bit(N,N-glycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethyrolpropane polyglycidyl ether, adipic acid diglycidyl ester, o-phthalic acid diglycidyl ester, triglycidyl-tris(2-hydroxyethyl) isocyanurate, resorcin diglycidyl ether, bisphenol-S-diglycidyl ether, and epoxy resins containing two or more epoxy groups within the molecule thereof.

These are not particularly restricted from the standpoint of controlling the gel fraction within a preferable range, but an example of particularly preferable embodiment is a mixture system of an epoxy type crosslinking agent and an isocyanate type crosslinking agent in which the epoxy type crosslinking agent is used in an amount of from 0.01 to 0.5 parts by weight and the isocyanate type crosslinking agent is used in an amount of from 0.5 to 5 parts by weight, with respect to 100 parts by weight of the acrylic polymer (a).

In the invention, the low-molecular weight polymer-containing pressure-sensitive adhesive layer may be formed by a crosslinking process by an irradiation with an electron beam or ultraviolet light, in place for or in addition to the use of crosslinking agent.

Thus, the crosslinking process allows to control the gel fraction of the low-molecular weight polymer-containing pressure-sensitive adhesive layer. In the invention, it is important that the low-molecular weight polymer-containing pressure-sensitive adhesive layer has a gel fraction of from 51 to 75 wt %. The gel fraction means a value calculated by the following "gel fraction measuring method".

(Gel Fraction Measuring Method)

An acrylic pressure-sensitive adhesive composition is coated on a releasing liner and dried or cured to form a pressure-sensitive adhesive layer. About 0.1 g of such pressure-sensitive adhesive layer are wrapped in a tetrafluoroethylene sheet of 0.2 μm (NTF1122 (trade name), manufactured by Nitto Denko Corporation) and bound with a string, and the weight of the wrap is measured as a weight before immersion. The weight before immersion is a total weight of the pressure-sensitive adhesive layer, the tetrafluoroethylene sheet and the string. The weight of the tetrafluoroethylene sheet and the string is also measured as a weight of the wrapping.

Then, the pressure-sensitive adhesive layer, wrapped in the tetrafluoroethylene sheet and bound with the string, is immersed in a 50-ml container filled with ethyl acetate, and is let to stand for one week (7 days) at the room temperature. Thereafter, the tetrafluoroethylene sheet is taken out from the container and dried at 130° C. for 2 hours in a dryer to eliminate ethyl acetate, and the weight of the sample is measured as a weight after immersion.

Then, the gel fraction is calculated according to the following formula:

$$\text{gel fraction (wt \%)} = (A-B)/(C-B) \times 100 \tag{1}$$

wherein A indicates the weight after immersion, B indicates the weight of wrapping and C indicates the weight before immersion.

In the invention, the gel fraction of the low-molecular weight polymer-containing pressure-sensitive adhesive layer is not particularly restricted as long as it is within a range of from 51 to 75 wt %, but is preferably from 53 to 72 wt % (more preferably from 55 to 70 wt %). When the gel fraction of the low-molecular weight polymer-containing pressure-sensitive adhesive layer lower than 51 wt %, it is difficult to obtain the desire cohesive power and lowers the repulsion resistance. On the other hand, when the gel fraction exceeds 75 wt %, a sufficient cohesive power can be obtained but the pressure-sensitive adhesive power is lowered, thereby resulting in an insufficient repulsion resistance.

Also, in the invention, it is important that the low-molecular weight polymer-containing pressure-sensitive adhesive layer has a temperature, at a maximum of loss tangent (tan δ), within a range of from −14 to 25° C. The temperature at a maximum of loss tangent means a value obtained by the following "measuring method for maximum of loss tangent".

(Measuring Method for Maximum of Loss Tangent)

An acrylic pressure-sensitive adhesive composition is coated on a releasing liner so as to obtain a thickness after drying of 35 μm, and dried or cured to form a pressure-sensitive adhesive layer. The pressure-sensitive adhesive layer is stacked to a thickness of about 2 mm to obtain a test sample. The test sample is sandwiched between parallel plates of 7.9 mm and is subjected to a viscoelasticity measurement on a viscoelastic tester (ARES, manufactured by Rheometrics Inc.), in a shear mode, under a shearing strain of 1 Hz, within a temperature range of from −70 to 150° C. and at a temperature elevating rate of 5° C./min to determine a temperature at a maximum of loss tangent (tan δ).

The temperature, at the maximum of loss tangent in the low-molecular weight polymer-containing pressure-sensitive adhesive layer, is not particularly restricted as long as it is within a range of from −14 to 25° C., but is preferably from −13 to 22° C. (more preferably from −12 to 20° C.). When the temperature, at the maximum of loss tangent in the low-molecular weight polymer-containing pressure-sensitive adhesive layer, is lower than −14° C., it is difficult to obtain a desired cohesive force and lower then repulsion resistance. On the other hand, when the temperature exceeds 25° C., a sufficient cohesive power can be obtained but the pressure-sensitive adhesive power is lowered, thereby resulting in an insufficient repulsion resistance. The temperature, at a maximum of loss tangent in the low-molecular weight polymer-containing pressure-sensitive adhesive layer, can be controlled by the monomer composition of the acrylic polymer (a), the monomer composition of the low-molecular weight polymer component (b), the blending proportion of the acrylic polymer (a) and the low-molecular weight polymer component (b), and types and amounts of various additives (such as pressure-sensitive adhesive property providing resin and plasticizer).

The low-molecular weight polymer-containing pressure-sensitive adhesive layer may have either form of a single layer structure and a laminated structure. The thickness (thickness after drying or curing) of the low-molecular weight polymer-containing pressure-sensitive adhesive layer may be suitably selected for example within a range of from 4 to 100 µm (preferably from 4 to 50 µm and more preferably from 10 to 40 µm).

The low-molecular weight polymer-containing pressure-sensitive adhesive layer is not restricted in the forming method therefor, and may be formed, for example, by a method of coating an acrylic pressure-sensitive adhesive on a predetermined surface, followed by an optional drying or curing, or a method of coating an acrylic pressure-sensitive adhesive on a separator (releasable liner), followed by an optional drying or curing to obtain a low-molecular weight polymer-containing pressure-sensitive adhesive layer, and transferring such low-molecular weight polymer-containing pressure-sensitive adhesive layer by adhering onto a predetermined surface. For coating the acrylic pressure-sensitive adhesive composition, a common coating equipment (such as a gravure roll coater, a reverse roll coater, a kiss roll coater, a dip roll coater, a bar coater, a knife coater or a spray coater) can be used.

Low-Molecular Weight Polymer-Free Pressure-Sensitive Adhesive Layer

In the case that the light-reflective/shielding pressure-sensitive adhesive tape or sheet of the invention has a form of a double-faced pressure-sensitive adhesive tape or sheet, and when a low-molecular weight polymer-containing pressure-sensitive adhesive layer is formed on one surface of the base material, a low-molecular weight polymer-free pressure-sensitive adhesive layer (a pressure-sensitive adhesive layer other than the low-molecular weight polymer-containing pressure-sensitive adhesive layer) may be formed on the other surface of the base material, as described above. The low-molecular weight polymer-free pressure-sensitive adhesive layer can be, for example, a pressure-sensitive adhesive layer formed by a pressure-sensitive adhesive composition not containing the low-molecular weight polymer component (b). It is important that the pressure-sensitive adhesive composition, for forming such low-molecular weight polymer-free pressure-sensitive adhesive layer, does not contain the low-molecular weight polymer component (b). Therefore, examples of the pressure-sensitive adhesive composition for forming the low-molecular weight polymer-free pressure-sensitive adhesive layer include not only an acrylic pressure-sensitive adhesive without containing the low-molecular weight polymer component (b), but also a rubber type pressure-sensitive adhesive, an urethane type pressure-sensitive adhesive, a silicone type pressure-sensitive adhesive, a polyester type pressure-sensitive adhesive, a polyamide type pressure-sensitive adhesive, an epoxy type pressure-sensitive adhesive, a vinyl alkyl ether type pressure-sensitive adhesive, and a fluorinated pressure-sensitive adhesive, and the acrylic pressure-sensitive adhesive without containing the low-molecular weight polymer component (b) can be employed advantageously. Such pressure-sensitive adhesive composition may be used singly or in combination of two or more kinds. Also the pressure-sensitive adhesive composition may be a pressure-sensitive adhesive of any form, such as an emulsion type pressure-sensitive adhesive, a solvent type pressure-sensitive adhesive or a hot-melt type pressure-sensitive adhesive.

In the invention, the pressure-sensitive adhesive composition for forming the low-molecular weight polymer-free pressure-sensitive adhesive layer may be an acrylic pressure-sensitive adhesive composition having a formulation similar to (or same as) the formulation of the acrylic pressure-sensitive adhesive composition for forming the low-molecular weight polymer-containing pressure-sensitive adhesive layer from which the low-molecular weight polymer component (b) is eliminated. Thus, the low-molecular weight polymer-free pressure-sensitive adhesive layer and the low-molecular weight polymer-containing pressure-sensitive adhesive layer may be formed from the acrylic pressure-sensitive adhesive compositions of similar (or same) formulations except for the presence/absence of the low-molecular weight polymer component (b).

Therefore, the low-molecular weight polymer-free pressure-sensitive adhesive layer can be formed by an acrylic pressure-sensitive adhesive composition which does not contain the low-molecular weight polymer component (b) but contains the acrylic polymer (a). In such acrylic pressure-sensitive adhesive composition, the acrylic polymer (a) is same as described above.

Preparation of an acrylic polymer such as the acrylic polymer (a) may involve generation of a low-molecular component (such as polymer of a low molecular weight), or an unreacted residual substance. Thus, in the case that the low-molecular weight polymer-free pressure-sensitive adhesive layer is an acrylic pressure-sensitive adhesive layer (for example an acrylic pressure-sensitive adhesive layer which does not contain the low-molecular weight polymer component (b) but contains the acrylic polymer (a)), the acrylic pressure-sensitive adhesive composition for forming the low-molecular weight polymer-free pressure-sensitive adhesive layer may contain a low-molecular weight polymer component (such as acrylic oligomers) which results from generation of a low-molecular component (such as a polymerized component of a low molecular weight) of a low-reacted substance or from a residual unreacted low-molecular component, in the preparation of the acrylic polymer as the base polymer. Such low-molecular weight polymer component, resulting from a low reaction level or lack or reaction, is a low-molecular component generated or remaining the preparation of the acrylic polymer, and can therefore be distinguished from the low-molecular weight polymer component (b) intentionally contained in the acrylic pressure-sensitive adhesive composition, for example by a content or by a formulation.

The acrylic pressure-sensitive adhesive composition for forming the low-molecular weight polymer-free pressure-sensitive adhesive layer, like the acrylic pressure-sensitive adhesive composition for forming the low-molecular weight polymer-containing pressure-sensitive adhesive layer, may contain, according to the necessity, various additives (such as a crosslinking agent, a cross bonding agent, a pressure-sensitive adhesive property providing resin, a filler, a flame retardant, an antiaging agent, an antistatic, a softener, an ultraviolet absorber, an antioxidant, a plasticizer, and a surfactant), and a crosslinking agent is preferably contained in consideration of the repulsion resistance. The type and amount of the crosslinking agent are similar to those in the case of the acrylic pressure-sensitive adhesive composition for forming the low-molecular weight polymer-containing pressure-sensitive adhesive layer.

The low-molecular weight polymer-free pressure-sensitive adhesive layer may have either form of a single layer structure and a laminated structure. The thickness (thickness after drying or curing) of the low-molecular weight polymer-free pressure-sensitive adhesive layer may be suitably selected for example within a range of from 4 to 100 μm (preferably from 4 to 50 μm and more preferably from 10 to 40 μm).

The low-molecular weight polymer-free pressure-sensitive adhesive layer is not restricted in the forming method therefor, and may be formed, for example, by a method of coating a pressure-sensitive adhesive composition on a predetermined surface, followed by an optional drying or curing, or a method of coating a pressure-sensitive adhesive composition on a separator (releasable liner), followed by an optional drying or curing to obtain a pressure-sensitive adhesive layer, and transferring such pressure-sensitive adhesive layer by adhering onto a predetermined surface. For coating the pressure-sensitive adhesive composition, a common coating equipment (such as a gravure roll coater, a reverse roll coater, a kiss roll coater, a dip roll coater, a bar coater, a knife coater or a spray coater) can be used.

Base Material

The light-reflective/shielding pressure-sensitive adhesive tape or sheet of the invention has a structure in which the pressure-sensitive adhesive layer(s), such as a low-molecular weight polymer-containing pressure-sensitive adhesive layer or a low-molecular weight polymer-free pressure-sensitive adhesive layer is/are formed on at least one surface of a base material, either directly or through another layer (such as a reflective layer or a light-shielding layer). The base material may be any of a plastic base material, a metal base material or a fibrous base material, but a plastic base material is advantageously utilized in consideration of precision, strength and thinness. Examples of the raw material for the base material include a polyester (such as polyethylene terephthalate, polyethylene naphthalate, polybutylene terephthalate, or polybutylene naphthalate), a polyolefin (such as polyethylene, polypropylene, or an ethylene-propylene copolymer), polyvinyl alcohol, polyvinylidene chloride, polyvinyl chloride, a vinyl chloride-vinyl acetate copolymer, polyvinyl acetate, a polyamide, a polyimide, a cellulose, a fluorinated resin, a polyether, a polystyrene resin (such as polystyrene), polycarbonate and polyethersulfon. These materials may be employed singly or in a combination of two or more kinds.

The base material may have either of a single layer structure and a multi-layered structure.

The base material, when constituting a black layer serving as a light-shielding layer (light-shielding base material) or a white- or silver-color layer serving as a reflective layer (reflective base material), may contain a colorant corresponding to the represented color (such as a black colorant, a white colorant or a silver colorant).

In the case that the base material is not a black layer serving as a light-shielding layer (light-shielding base material) nor a white- or silver-color layer serving as a reflective layer (reflective base material), a base material having transparency (also called "transparent base material") can be used advantageously.

The base material may contain, according to the necessity, conventional additives such as a filler, a flame retardant, an antiaging agent, an antistatic, a softener, an ultraviolet absorber, an antioxidant, a plasticizer, or a surfactant.

The thickness of the base material is not particularly restricted, and may be suitably selected for example within a range of from 1 to 150 μm (preferably from 2 to 100 μm and more preferably from 4 to 75 μm).

The base material is not particularly restricted in the forming method therefor, and may be formed for example by a method of molding a resin composition constituting the base material into a sheet by a molding method such as an extrusion molding, an inflation molding or a calendar molding.

Reflective Layer

The light-reflective/shielding pressure-sensitive adhesive tape or sheet of the invention, when it has a reflectance of 60% or higher on at least one surface thereof, is provided with a reflective layer for realizing a reflectance of 60% or higher, on the surface (one surface or both surfaces) having the reflectance of 60% or higher. It is important that the reflective layer has such a reflectance capable of realizing a reflectance of 60% or higher on a predetermined surface of the light-reflective/shielding pressure-sensitive adhesive tape or sheet. Therefore, the reflectance of the reflective layer is, like the reflectance of the light-reflective/shielding pressure-sensitive adhesive tape or sheet, importantly 60% or higher (from 60 to 100%), preferably 70% or higher and particularly 80% or higher.

Such reflective layer may be any layer capable of exhibiting a reflective property, and may for example be any one of a pressure-sensitive adhesive layer, a resin layer (such as a film layer) and an ink layer. In the case that the reflective layer is a resin layer (particularly a film layer), such resin layer (particularly a film layer) serving as the reflective layer may also be used as the base material.

The reflective layer is to be provided, in order to reflect a light irradiating one surface of the light-reflective/shielding pressure-sensitive adhesive tape or sheet, in such a form as to realize a reflectance of 60% or higher on one surface of the light-reflective/shielding pressure-sensitive adhesive tape or sheet, and may be provided in such a form as to be exposed on one surface of the light-reflective/shielding pressure-sensitive adhesive tape or sheet, or in such a form positioned inside a layer having transparency (such as a transparent pressure-sensitive adhesive layer or a transparent base material). In the case that the light-reflective/shielding pressure-sensitive adhesive tape or sheet has a light-shielding layer as described below, the reflective layer is preferably formed on the surface on the base material side, with respect to the light-shielding layer.

In the invention, the reflective layer is preferably a resin layer (such as a film layer), and particularly preferably a film layer. The reflective layer may be formed by various material capable of exhibiting a reflective property, such as a pressure-sensitive adhesive composition, a resin composition or an ink composition.

Examples of such reflective layer include a white-colored layer having a white color and a silver-colored layer having a silver color, but a white-colored layer having a white color can be employed advantageously. White color basically means a whitish color having $L^*$, defined in $L^*a^*b^*$ color space, of 87 or larger (from 87 to 100) and preferably 90 or larger (from 90 to 100). In this regard, $a^*$ and $b^*$, defined in the $L^*a^*b^*$ color space, each can be suitably selected according to the value of $L^*$. For example, each of $a^*$ and $b^*$ is preferably within a range of from −10 to 10 (particularly from −5 to 5), and more preferably 0 or about 0 (within a range of from −2 to 2).

Silver color basically means a silver-like color having $L^*$, defined in $L^*a^*b^*$ color space, of from 70 to 90, (preferably from 72 to 88 and more preferably from 75 to 85). In this regard, $a^*$ and $b^*$, defined in the $L^*a^*b^*$ color space, each can be suitably selected according to the value of $L^*$. For example each of $a^*$ and $b^*$ is preferably within a range of from −10 to 10 (particularly from −5 to 5), and more preferably 0 or about 0 (within a range of from −2 to 2).

In the invention, $L^*$, $a^*$ and $b^*$ defined in the $L^*a^*b^*$ color space can be determined by a measurement with a color difference meter CR-200 (trade name), manufactured by Minolta Ltd. The L*a*b* color space is a color space recommended by the Commission Internationale de l'Eclairage (CIE) in 1976, and means a color space called CIE1976 (L*a*b*) color space. Also the L*a*b* color space is defined in Japanese Industrial Standards in JIS Z8729.

It is important that such reflective layer such as a white-colored layer or a silver-colored layer contains a colorant corresponding to the represented color. In the case that the reflective layer is a white-colored layer, for example a white-colored colorant may be used as the colorant. Also in the case that the reflective layer is a silver-colored layer, for example a silver-colored colorant may be used as the colorant. More specifically, when the reflective layer is an ink layer showing a white color (white-colored ink layer, particularly a printed layer showing a white color (white-colored printed layer)), the white-colored ink layer can be formed for example by a white ink composition principally containing a white-colored colorant. On the other hand, when the reflective layer is an ink layer showing a silver color (silver-colored ink layer, particularly a printed layer showing a silver color (silver-colored printed layer), the silver-colored ink layer can be formed for example by a silver-colored ink composition principally containing a silver-colored colorant.

Also when the reflective layer is a resin layer showing a white color (white-colored resin layer, particularly a film layer showing a white color (white-colored film layer)), the white-colored resin layer can be formed for example by a resin composition containing a white-colored resin, or by a resin composition containing a white-colored colorant. On the other hand, when the reflective layer is a resin layer showing a silver color (silver-colored resin layer, particularly a film layer showing a silver color (silver-colored film layer)), the silver-colored resin layer can be formed for example by a resin composition containing a silver-colored colorant.

Each of the white-colored colorant and the silver-colored colorant may be any colorant (coloring agent) such as a pigment or a dye, but a pigment can be employed advantageously. Specific examples of the white-colored colorant include inorganic white colorants such as titanium oxide (titanium dioxide such as rutile type titanium dioxide or anatase type titanium dioxide), zinc oxide, aluminum oxide, silicon oxide, zirconium oxide, magnesium oxide, calcium oxide, tin oxide, barium oxide, cesium oxide, yttrium oxide, magnesium carbonate, calcium carbonate (such as light calcium carbonate or heavy calcium carbonate), barium carbonate, zinc carbonate, aluminum hydroxide, calcium hydroxide, magnesium hydroxide, zinc hydroxide, aluminum silicate, magnesium silicate, calcium silicate, barium silicate, calcium sulfate, barium stearate, zinc oxide, zinc sulfide, talc, silica, alumina, clay, caolin, titanium phosphate, mica, gypsum, white carbon, diatomaceous earth, bentonite, lithopone, zeolite, sericite, and hydrated halloysite, and organic white colorants such as acrylic resin particles, polystyrene type resin particles, polyurethane type resin particles, amide type resin particles, polycarbonate type resin particles, silicone type resin particles, urea-formalin type resin particles, and melamine type resin particles. As the white-colored colorant, also employable is a fluorescent whitening agent, which can be suitably selected among those already known. The white-colored colorant may be employed singly or in a combination of two or more kinds.

Further, examples of the silver-colored colorant include silver and aluminum. The silver-colored colorant may be employed singly or in a combination of two or more kinds.

The ink composition for forming the reflective layer (such as a white-colored ink composition or a silver-colored ink composition) contains, in addition to the colorant, a binder, a dispersant, a solvent and the like according to the necessity. The binder is not particularly restricted, and examples thereof include conventional resins (for example thermoplastic resins, thermally curable resins and photocurable resins) such as a polyurethane resin, a phenolic resin, an epoxy resin, an urea-melamine resin, a silicone resin, a phenoxy resin, a methacrylic resin, an acrylic resin, a polyallylate resin, a polyester resin (such as polyethylene terephthalate), a polyolefin resin (such as polyethylene, polypropylene or an ethylene-propylene copolymer), a polystyrene resin (such as polystyrene, a styren-acrylonitrile copolymer, a styrene-butadiene copolymer, a styrene-maleci anhydride copolymer, or an acrylonitrile-butadiene-styrene resin), polyvinyl chloride, a vinyl chloride-vinyl acetate copolymer, polyvinyl acetate, polyvinylidene chloride, polycarbonate, a cellulose (such as a cellulose acetate resin or an ethyl cellulose resin), and polyacetal. The binder may be employed singly or in a combination of two or more kinds.

In the resin composition for forming a white-colored resin layer (particularly a white-colored film layer) or a silver-colored resin layer (particularly a silver-colored film layer), examples of the resin (white-colored resin or resin of another color such as a transparent resin) include polyesters (such as polyethylene terephthalate, polyethylene naphthalate, polybutylene terephthalate or polybutylene naphthalate), polyolefins (such as polyethylene, polypropylene or ethylene-propylene copolymer), polyvinyl alcohol, polyvinylidene chloride, polyvinyl chloride, a vinyl chloride-vinyl acetate copolymer, polyvinyl acetate, polyamide, polyimide, a cellulose, fluorinated resin, polyether, polystyrenic resin (such as polystyrene), polycarbonate, and polyethersulfon. In case of employing a white-colored colorant or a silver-colored colorant, a transparent resin is preferably employed as the resin. The resin may be employed singly or in a combination of two or more kinds.

The resin composition for forming the white-colored resin layer or the silver-colored resin layer may contain, according to the necessity, conventional additives such as a filler, a flame retardant, an antiaging agent, an antistatic, a softener, an ultraviolet absorber, an antioxidant, a plasticizer, or a surfactant.

Among the reflective layer, a silver-colored layer may also be formed by an evaporation method of a metal component, capable of exhibiting a silver-like color, such as silver of aluminum. As the evaporation method, employable is a reduced-pressure evaporation (vacuum evaporation) process, a physical sputtering process or a chemical sputtering process.

The reflective layer may have either form of a single layer structure and a multi-layered structure, but preferably has a multi-layered structure for further improving the reflective property. Therefore, the light-reflective/shielding pressure-sensitive adhesive tape or sheet preferably has a reflective layer of a multi-layered structure (particularly a white-colored layer of a multi-layered structure). In the case that the reflective layer has a multi-layered structure, the number of the layers of the reflective layer can be two or larger, and can be selected for example within a range of from 2 to 10, preferably from 2 to 6 (further preferably from 2 to 4 and particularly preferably 2).

In the case that the reflective layer has a multi-layered structure, it is important to regulate not the reflectance of each reflective layer but the reflectance in the entire reflective layer of the multi-layered structure, in such a manner that the light-reflective/shielding pressure-sensitive adhesive tape or sheet has a reflectance of 60% or higher.

The thickness of the reflective layer (in case of a reflective layer of a multi-layered structure, the thickness of the entire reflective layer of the multi-layered structure) is not particularly restricted and can be suitably selected for example within a range of from 5 to 150 μm (preferably from 10 to 100 μm). Also in case of a silver-colored layer formed by an evaporation method as a reflective layer, the thickness is not particularly restricted and may be for example within a range of from 0.3 to 2 μm (preferably from 0.4 to 1 μm and more preferably from 0.4 to 0.5 μm).

In the invention, the reflective layer may be formed as the base material (namely a reflective base material) or as the pressure-sensitive adhesive layer (namely a reflective pressure-sensitive adhesive layer), but is preferably a layer provided on the base material (particularly a printed layer (reflective printed layer) provided between the base material and the light-shielding layer). In the case that the reflective layer has a multi-layered structure, a reflective base material and a reflective pressure-sensitive adhesive layer may be included as layers belonging to the reflective layer of multi-layered structure. More specifically, examples of the layer structure of the reflective layer include a layer structure formed by one or more reflective printed layers, a layer structure formed by a reflective base material and one or more reflective printed layers formed thereon, a layer structure formed by one or more reflective printed layers and a reflective pressure-sensitive adhesive layer formed thereon, and a layer structure formed by a reflective base material, one or more reflective printed layers formed thereon, and a reflective pressure-sensitive adhesive layer formed thereon.

The reflective layer may also have a multi-layered structured including a white-colored layer and a silver-colored layer. When the reflective layer thus includes a white-colored layer and a silver-colored layer, at least either of the white-colored layer and the silver-colored layer may be a reflective base material or a reflective pressure-sensitive adhesive layer.

The forming method for the reflective layer is not particularly restricted, and may be suitably selected from conventional forming methods for the reflective layer, according to the type and the layer structure of the reflective layer. More specifically, when the reflective layer is for example a reflective printed layer formed by an ink composition on the base material, such reflective printed layer may be formed, for example, by a method of coating the ink composition for forming reflective printed layer on the base material, followed by an optional drying, or by a method utilizing various printing process (such as gravure printing, flexo printing, offset printing, letterpress printing, or screen printing). Further, when the reflective layer is a silver-colored layer, such silver-colored layer as a reflective layer may also be formed by a method utilizing evaporation, as described above. Moreover, when the reflective layer is a reflective base material formed by a plastic material, it may be formed for example by a method of molding a plastic composition constituting the reflective base material into a sheet by a molding method such as an extrusion molding, an inflation molding or a calendar molding. Further, in the case that the reflective layer is a multi-layered reflective layer including a reflective base material, such reflective layer may be formed by a process combining the aforementioned methods.

Light-Shielding Layer

The light-reflective/shielding pressure-sensitive adhesive tape or sheet of the invention, when having a transmittance of 0.3% or lower, is provided with a light-shielding layer for realizing a transmittance of 0.3% or lower. It is important that the light-shielding layer has such a transmittance capable of realizing a transmittance of 0.3% or lower in the light-reflective/shielding pressure-sensitive adhesive tape or sheet. Therefore, the transmittance of the light-shielding layer is, like the transmittance of the light-reflective/shielding pressure-sensitive adhesive tape or sheet, importantly 0.3% or lower (from 0 to 0.3%), preferably 0.1% or lower (more preferably 0.05% or lower) and further 0.03% or lower (particularly 0.01% or lower).

As the transmittance of the light-shielding layer corresponds to (or coincides with) the transmittance of the light-reflective/shielding pressure-sensitive adhesive tape or sheet, the transmittance of the light-shielding layer can be determined by measuring the transmittance of the light-reflective/shielding pressure-sensitive adhesive tape or sheet, without extracting the light-shielding layer from the light-reflective/shielding pressure-sensitive adhesive tape or sheet.

Such light-shielding layer may be any layer capable of exhibiting a light-shielding property, and may for example be any one of a pressure-sensitive adhesive layer, a resin layer (such as a film layer) and an ink layer (printed layer). In the invention, the light-shielding layer is preferably an ink layer, and particularly a printed layer (light-shielding printed layer). The light-shielding layer can be formed by various materials (such as a pressure-sensitive adhesive composition, a resin composition or an ink composition) capable of exhibiting a light-shielding property.

In the invention, the light-shielding layer is preferably a black-colored layer showing black color. In the black-colored layer, black color basically means a blackish color having $L^*$, defined in $L^*a^*b^*$ color space, of 35 or less (from 0 to 35), preferably 30 or less (from 0 to 30) and more preferably 25 or less (from 0 to 25). In this regard, $a^*$ and $b^*$, defined in the $L^*a^*b^*$ color space, each can be suitably selected according to the value of $L^*$. For example each of $a^*$ and $b^*$ is preferably within a range of from −10 to 10 (particularly from −5 to 5), and more preferably 0 or about 0 (within a range of from −2 to 2).

It is important that the light-shielding layer such as a black-colored layer contains a colorant corresponding to the represented color. In the case that the light-shielding layer is a black-colored layer, for example a black-colored colorant may be employed. More specifically, when the light-shielding layer is an ink layer showing a black color (black-colored ink layer), particularly a printed layer showing a black color (black-colored printed layer), the black-colored ink layer (particularly, the black-colored printed layer) can be formed for example by a black-ink composition principally containing a black-colored colorant.

Further, the light-shielding layer may be a resin layer showing a black color (black resin layer, particularly a film layer showing black color (black film layer)). When the light-shielding layer is a black resin layer (black-colored resin layer), the black resin layer can be formed for example by a black-colored resin composition principally containing a black-colored colorant.

The black-colored colorant may be any colorant (coloring agent) such as a pigment or a dye, but a pigment can be employed advantageously. Specific examples of the black-colored colorant include carbon black (such as furnace black, channel black, acetylene black, thermal black or lamp black), graphite, copper oxide, manganese dioxide, aniline black, perylene black, titanium black, cyanine black, active charcoal, ferrite (such as non-magnetic ferrite or magnetic ferrite), magnetite, chromium oxide, iron oxide, molybdenum dioxide, chromium complex, a composite oxide type black dye, and an anthraquinone type organic black dye. The black-colored colorant may be employed singly or in a combination of two or more kinds.

As the black-colored colorant, employable also is a colorant mixture in which a cyan-colored colorant (blue-green colorant), a magenta-colored colorant (red-purple colorant) and a yellow-colorant colorant (yellow colorant). Further, a film layer showing black color may be a multi-layered film layer, constituted of a film layer formed by a cyan ink composition principally containing a cyan-colored colorant, a film layer formed by a magenta ink composition principally containing a magenta-colored colorant, and a film layer formed by a yellow ink composition principally containing a yellow-colored colorant.

Among the cyan colorants, examples of pigment (cyan-colored pigment) include C.I. Pigment Blue 1, 2, 3, 15, 15:1, 15:2, 15:3, 15:4, 15:5, 15:6, 16, 17, 17:1, 18, 22, 25, 56, 60, 63, 65, 66; C.I. Vat Blue 4, 60; and C.I. Pigment Green 7. Among the cyan colorants, examples of dye (cyan-colored dye) include C.I. Solvent Blue 25, 36, 60, 70, 93, 95; C.I. Acid Blue 6 and 45.

Among the magenta colorants, examples of pigment (magenta-colored pigment) include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 42, 48:1, 48:2, 48:3, 48:4, 49, 49:1, 50, 51, 52, 52:2, 53:1, 54, 55, 56, 57:1, 58, 60, 60:1, 63, 63:1, 63:2, 64, 64:1, 67, 68, 81, 83, 87, 88, 89, 90, 92, 101, 104, 105, 106, 108, 112, 114, 122, 123, 139, 144, 146, 147, 149, 150, 151, 163, 166, 168, 170, 171, 172, 175, 176, 177, 178, 179, 184, 185, 187, 190, 193, 202, 206, 207, 209, 219, 222, 224, 238, 245; C.I. Pigment Violet 3, 9, 19, 23, 31, 32, 33, 36, 38, 43, 50; C.I. Vat Red 1, 2, 10, 13, 15, 23, 29 and 35.

Among the magenta colorants, examples of dye (magenta-colored dye) include C.I. Solvent Red 1, 3, 8, 23, 24, 25, 27, 30, 49, 52, 58, 63, 81, 82, 83, 84, 100, 109, 111, 121, 122; C.I. Disperse Red 9; C.I. Solvent Violet 8, 13, 14, 21, 27; C.I. Disperse Violet 1; C.I. Basic Red 1, 2, 9, 12, 13, 14, 15, 17, 18, 22, 23, 24, 27, 29, 32, 34, 35, 36, 37, 38, 39, 40; C.I. Basic Violet 1, 3, 7, 10, 14, 15, 21, 25, 26, 27 and 28.

Among the yellow colorants, examples of pigment (yellow-colored pigment) include C.I. Pigment Orange 31, 43; C.I. Pigment Yellow 1, 2, 3, 4, 5, 6, 7, 10, 11, 12, 13, 14, 15, 16, 17, 23, 24, 34, 35, 37, 42, 53, 55, 65, 73, 74, 75, 81, 83, 93, 94, 95, 97, 98, 100, 101, 104, 108, 109, 110, 113, 114, 116, 117, 120, 128, 129, 133, 138, 139, 147, 150, 151, 153, 154, 155, 156, 167, 172, 173, 180, 185, 195; C.I. Vat Yellow 1, 3, and 20. Also among the yellow colorants, examples of dye (yellow-colored dye) include C.I. Solvent Yellow 19, 44, 77, 79, 81, 82, 93, 98, 103, 104, 112, and 162.

In the case that the black-colored colorant is a colorant mixture formed by mixing a cyan-colored colorant, a magenta-colored colorant and a yellow-colored colorant, each of the cyan-colored colorant, the magenta-colored colorant and the yellow-colored colorant may be used singly or in a combination of two or more kinds. The mixing ratio (or blending ratio) of the cyan-colored colorant, the magenta-colored colorant and the yellow-colored colorant in the colorant mixture is not particularly restricted as long as a black-like color can be exhibited, and may be suitably selected according for example to the type of each colorant. The contents of the cyan-colored colorant, the magenta-colored colorant and the yellow-colored colorant in the colorant mixture can be suitably selected for example within a range, with respect to the total amount of the colorants, of cyan-colored colorant/magenta-colored colorant/yellow-colored colorant=10-50 wt %/10-50 wt %/10-50 wt % (preferably 20-40 wt %/20-40 wt %/20-40 wt %).

In the case that the light-shielding layer is an ink layer such as a printed layer, as an ink composition for forming such ink layer employed is a black-color ink composition principally containing a black-colored colorant as the colorant. The black-color ink composition contains, in addition to the black-colored colorant, a binder, a dispersant, a solvent and the like according to the necessity. Examples of the binder are those described above as examples for the ink composition for the reflective layer (such as a white-color ink composition or a silver-color ink composition).

Further, the resin to be employed in the black resin layer (particularly black film layer) can be suitably selected from the resins described for use in the resin composition for forming the white-color resin layer (particularly white-color film layer) or the silver-color resin layer (particularly silver-color film layer).

In the invention, the light-shielding layer may have either form of a single layer structure and a multi-layered structure, but preferably has a multi-layered structure. Therefore, the light-reflective/shielding pressure-sensitive adhesive tape or sheet preferably has a light-shielding layer of a multi-layered structure (particularly a black-color layer of a multi-layered structure). Such multi-layered structure in the light-shielding layer allows to further improve the light-shielding property of the light-shielding layer. In the case that the light-shielding layer has a multi-layered structure, the number of the layers of the light-shielding layer can be two or larger, and can be selected for example within a range of from 2 to 10, preferably from 3 to 8 (further preferably from 4 to 6 and particularly preferably 4).

In the case that the light-shielding layer has a multi-layered structure, it is important to regulate not the transmittance of each light-shielding layer but the transmittance in the entire light-shielding layer of the multi-layered structure, in such a manner that the light-reflective/shielding pressure-sensitive adhesive tape or sheet has a transmittance of 0.3% or less.

The thickness of the light-shielding layer is not particularly restricted. When the light-shielding layer is for example formed by a printed layer (light-shielding printed layer), the thickness of the light-shielding printed layer (in case of a light-shielding printed layer of a multi-layered structure, the thickness of the entire light-shielding printed layer) may be selected within a range of from 0.5 to 20 μm (preferably from 2 to 15 μm). Further, in the case that the light-shielding layer is a resin layer or a pressure-sensitive adhesive layer, the thickness of the light-shielding layer may be selected within the ranges described as examples of the thicknesses of the base material and the pressure-sensitive adhesive layer.

In the invention, the light-shielding layer may be formed as the base material (namely a light-shielding base material) or as the pressure-sensitive adhesive layer (namely a light-shielding pressure-sensitive adhesive layer), but is preferably a layer provided on the base material (particularly a printed layer (light-shielding printed layer) provided between the base material and the pressure-sensitive adhesive layer). In the case that the light-shielding layer has a multi-layered structure, a light-shielding base material and a light-shielding pressure-sensitive adhesive layer may be included as layers belonging to the light-shielding layer of multi-layered structure. More specifically, examples of the layer structure of the light-shielding layer include a layer structure formed by one or more light-shielding printed layers, a layer structure formed by a light-shielding base material and one or more light-shielding printed layers formed thereon, a layer structure formed by one or more light-shielding printed layers and a light-shielding pressure-sensitive adhesive layer formed thereon, and a layer structure formed by a light-shielding base material, one or more light-shielding printed layers formed thereon, and a light-shielding pressure-sensitive adhesive layer formed thereon.

The forming method for the light-shielding layer is not particularly restricted, and may be suitably selected from conventional forming methods for the light-shielding layer, according to the type and the layer structure of the light-shielding layer. More specifically, when the light-shielding layer is for example a light-shielding printed layer formed by an ink composition (for example a black-colored ink composition) and provided between the base material and the pressure-sensitive adhesive layer, it may be formed, for example, by a method of coating the ink composition for forming light-shielding printed layer on the base material, followed by an optional drying, or by a method utilizing various printing process (such as gravure printing, flexo printing, offset printing, letterpress printing, or screen printing). Further, when the light-shielding layer is a resin layer, it may be formed for example by a method of molding a plastic composition into a sheet by a molding method such as an extrusion molding, an inflation molding or a calendar molding, and laminating such sheet-shaped resin layer on a predetermined surface (for example on base material). Also, in the case that the light-shielding layer is a multi-layered light-shielding layer including an ink layer, a resin layer and a pressure-sensitive adhesive layer, such light-shielding layer may be formed by a process combining the conventional forming methods for the layers (such as ink layer, resin layer and pressure-sensitive adhesive layer).

Other Layers

The light-reflective/shielding pressure-sensitive adhesive tape or sheet of the invention may further contain other layers. The light-reflective/shielding pressure-sensitive adhesive tape or sheet, when it has a black-colored layer as a light-shielding layer and a white-colored or silver-colored layer as a reflective layer, may further include, between the black-colored layer and the white- or silver-colored layer, another layer exhibiting a color other than black color and other than white or silver color (particularly a light reflection/shielding regulating layer capable of stepwise regulating the light-shielding property and the light-reflective property from one side to the other). Thus, by forming a reflection/shielding regulating layer as another layer between the reflective layer and the light-shielding layer (namely by forming the reflective layer, the reflection/shielding regulating layer and the light-shielding layer in this order), the light-reflective/shielding pressure-sensitive adhesive tape or sheet can exhibit a light-shielding property changing stepwise from the side of the light-shielding layer to the side of the reflective layer, and a reflective property changing stepwise from the side of the reflective layer to the side of the light-shielding layer.

In the layer showing a color other than black color, white color or silver color, the color other than black color, white color or silver color may be any color other than black color, white color or silver color, and may be, for example, red color, blue color, yellow color, green color, yellow-green color, orange color, purple color, gray color, or gold color. A color other than black or white color may be silver color or gray color, and a color other than black or silver color may be white color.

The light-reflective/shielding pressure-sensitive adhesive tape or sheet of the invention, including a base material as described above, has a form of a base-containing double-faced pressure-sensitive adhesive tape or sheet. The light-reflective/shielding pressure-sensitive adhesive tape or sheet includes a base material and a low-molecular weight polymer-containing pressure-sensitive adhesive layer(s) formed on at least one surface (one surface or both surfaces) of the base material, and has characteristics that at least one surface has a reflectance of 60% or higher and/or a transmittance of 0.3% or lower. More specifically, the light-reflective/shielding pressure-sensitive adhesive tape or sheet may for example have one of following layer structures (A1) to (A8), (B1) to (B8), (C1) to (C8) and (D1) to (D9):

layer structure (A1): structure of light-shielding base material/transparent low-molecular weight polymer-containing pressure-sensitive adhesive layer layer structure (A2): structure of transparent base material/light-shielding low-molecular weight polymer-containing pressure-sensitive adhesive layer layer structure (A3): structure of transparent base material/one or more light-shielding layers/transparent low-molecular weight polymer-containing pressure-sensitive adhesive layer layer structure (A4): structure of light-shielding base material/one or more light-shielding layers/transparent low-molecular weight polymer-containing pressure-sensitive adhesive layer layer structure (A5): structure in which the transparent low-molecular weight polymer-containing pressure-sensitive adhesive layer in the layer structures (A1) and (A3) to (A4) is replaced by a light-shielding low-molecular weight polymer-containing pressure-sensitive adhesive layer layer structure (A6): structure in which, on a surface (exposed surface) of the base material (transparent base material or light-shielding base material) in the layer structures (A1) to (A5), a transparent low-molecular weight polymer-free pressure-sensitive adhesive layer or a light-shielding low-molecular weight polymer-free pressure-sensitive adhesive layer is provided either directly or across one or more light-shielding layers player structure (A7): structure in which, on a surface (exposed surface) of the base material (transparent base material or light-shielding base material) in the layer structures (A1) to (A5), a transparent low-molecular weight polymer-containing pressure-sensitive adhesive layer or a light-shielding low-molecular weight polymer-containing pressure-sensitive adhesive layer is provided either directly or across one or more light-shielding layers layer structure (A8): structure in which, on a surface (exposed surface) of the base material (transparent base material or light-shielding base material) in the layer structures (A1) to (A5), one or more light-shielding layers are formed layer structure (B1): structure of reflective base material/transparent low-molecular weight polymer-containing pressure-sensitive adhesive layer layer structure (B2): structure of transparent base material/reflective low-molecular weight polymer-containing pressure-sensitive adhesive layer layer structure (B3): structure of transparent base material/one or more reflective layers/transparent low-molecular weight polymer-containing pressure-sensitive adhesive layer layer structure (B4): structure of reflective base material/one or more reflective layers/transparent low-molecular weight polymer-containing pressure-sensitive adhesive layer layer structure (B5): structure in which the transparent low-molecular weight polymer-containing pressure-sensitive adhesive layer in the layer structures (B1) and (B3) to (B4) is replaced by a reflective low-molecular weight polymer-containing pressure-sensitive adhesive layer layer structure (B6): structure in which, on a surface (exposed surface) of the base material (transparent base material or reflective base material) in the layer structures (B1) to (B5), a transparent low-molecular weight polymer-free pressure-sensitive adhesive layer or a reflective low-molecular weight polymer-free pressure-sensitive adhesive layer is provided either directly or across one or more light-shielding layers layer structure (B7): structure in which, on a surface (exposed surface) of the base material (transparent base material or reflective base material) in the layer structures (B1) to (B5), a transparent low-molecular weight polymer-containing pressure-sensitive adhesive layer or a reflective low-molecular weight polymer-containing pressure-sensitive adhesive layer is provided either directly or across one or more light-shielding layers layer structure (B8): structure in which, on a surface (exposed surface) of the base material (transparent base material or reflective base material) in the layer structures (B1) to (B5), one or more reflective layers are formed layer structure (C1): structure of transparent base material/ one or more reflective layers/one or more light-shielding layer/transparent low-molecular weight polymer-containing pressure-sensitive adhesive layer layer structure (C2): structure of reflective base material/ one or more reflective layers/one or more light-shielding layers/transparent low-molecular weight polymer-containing pressure-sensitive adhesive layer layer structure (C3): structure of one or more reflective layers/transparent base material/one or more light-shielding layers/transparent low-molecular weight polymer-containing pressure-sensitive adhesive layer layer structure (C4): structure of one or more reflective layers/reflective base material/one or more light-shielding layers/transparent low-molecular weight polymer-containing pressure-sensitive adhesive layer layer structure (C5): structure of one or more reflective layers/light-shielding base material/one or more light-shielding layers/transparent low-molecular weight polymer-containing pressure-sensitive adhesive layer layer structure (C6): structure in which the transparent low-molecular weight polymer-containing pressure-sensitive adhesive layer in the layer structures (C1) to (C5) is replaced by a light-shielding low-molecular weight polymer-containing pressure-sensitive adhesive layer layer structure (C7): structure in which, on a surface (exposed surface) of the base material (transparent base material or reflective base material) in the layer structures (C1) to (C2), or on a surface (exposed surface) of the one or more reflective layers in the layer structures (C3) to (C5), a transparent low-molecular weight polymer-free pressure-sensitive adhesive layer or a reflective low-molecular weight polymer-free pressure-sensitive adhesive layer is formed layer structure (C8): structure in which, on a surface (exposed surface) of the base material (transparent base material or reflective base material) in the layer structures (C1) to (C2), or on a surface (exposed surface) of the one or more reflective layers in the layer structures (C3) to (C5), a transparent low-molecular weight polymer-containing pressure-sensitive adhesive layer or a reflective low-molecular weight polymer-containing pressure-sensitive adhesive layer is formed layer structure (D1): structure of transparent base material/ one or more light-shielding layers/one or more reflective layer/transparent low-molecular weight polymer-containing pressure-sensitive adhesive layer layer structure (D2): structure of light-shielding base material/one or more light-shielding layers/one or more reflective layers/transparent low-molecular weight polymer-containing pressure-sensitive adhesive layer layer structure (D3): structure of one or more light-shielding layers/transparent base material/one or more reflective layers/transparent low-molecular weight polymer-containing pressure-sensitive adhesive layer layer structure (D4): structure of one or more light-shielding layers/light-shielding base material/one or more reflective layers/transparent low-molecular weight polymer-containing pressure-sensitive adhesive layer layer structure (D5): structure of one or more light-shielding layers/reflective base material/one or more reflective layers/transparent low-molecular weight polymer-containing pressure-sensitive adhesive layer layer structure (D6): structure in which the transparent low-molecular weight polymer-containing pressure-sensitive adhesive layer in the layer structures (D1) to (D5) is replaced by a reflective low-molecular weight polymer-containing pressure-sensitive adhesive layer layer structure (D7): structure in which, on a surface (exposed surface) of the base material (transparent base material or light-shielding base material) in the layer structures (D1) to (D2), a transparent low-molecular weight polymer-free pressure-sensitive adhesive layer or a light-shielding low-molecular weight polymer-free pressure-sensitive adhesive layer is formed layer structure (D8): structure in which, on a surface (exposed surface) of the base material (transparent base material or light-shielding base material) in the layer structures (D1) to (D2), a transparent low-molecular weight polymer-containing pressure-sensitive adhesive layer or a reflective low-molecular weight polymer-containing pressure-sensitive adhesive layer is formed layer structure (D9): structure in which, on a surface (exposed surface) of one or more light-shielding layers in a layer structure of one or more light-shielding layers/one or more reflective layers/reflective base material/transparent low-molecular weight polymer-containing pressure-sensitive adhesive layer, a transparent low-molecular weight polymer-containing pressure-sensitive adhesive layer is formed.

In this manner, the light-reflective/shielding pressure-sensitive adhesive tape or sheet may have a structure including the pressure-sensitive adhesive layer on one surface only, or a structure including the pressure-sensitive adhesive layers on both surfaces. Further, the light-reflective/shielding pressure-sensitive adhesive tape or sheet may have a laminated form of sheets, or a form wound in a roll. Among the layer structures above, preferable ones include (A6), (A7), (B6), (B7), (C7), (C8), (D7), (D8) and (D9), particularly preferably (B7) and (C8).

In the light-reflective/shielding pressure-sensitive adhesive tape or sheet, the surface of the pressure-sensitive adhesive layer (low-molecular weight polymer-containing pressure-sensitive adhesive layer or low-molecular weight polymer-free pressure-sensitive adhesive layer) may be protected by a conventional separator (releasable liner). Further, in the case that the light-reflective/shielding pressure-sensitive adhesive tape or sheet has a structure having the low-molecular weight polymer-containing pressure-sensitive adhesive layer only on one surface of the base material, the surface of the low-molecular weight polymer-containing pressure-sensitive adhesive layer may be protected for example by forming a releasably treated layer by means of a conventional releasing treatment agent (such as silicone type releasing treatment agent) on a surface (rear surface) of the base material not bearing the low-molecular weight polymer-containing pressure-sensitive adhesive layer and winding the tape or sheet in such a form that the releasably treated layer and the low-molecular weight polymer-containing pressure-sensitive adhesive layer are contacted with each other.

When the light-reflective/shielding pressure-sensitive adhesive tape or sheet of the invention has a reflectance of 60% or higher on one surface thereof, it can be advantageously utilized as a pressure-sensitive adhesive tape or sheet having a reflective property (reflective pressure-sensitive adhesive tape or sheet). Further, when the light-reflective/shielding pressure-sensitive adhesive tape or sheet of the invention has a transmittance of 0.3% or lower, it can be advantageously utilized as a pressure-sensitive adhesive tape or sheet having a light-shielding property (light-shielding pressure-sensitive adhesive tape or sheet). Moreover, when the light-reflective/shielding pressure-sensitive adhesive tape or sheet of the invention has a reflectance of 60% or higher on one surface thereof and has a transmittance of 0.3% or lower, it can be advantageously utilized as a pressure-sensitive adhesive tape or sheet having a reflective property and a light-shielding property (reflective/light-shielding pressure-sensitive adhesive tape or sheet). Such light-reflective/shielding pressure-sensitive adhesive tape or sheet may be a pressure-sensitive adhesive tape or sheet having pressure-sensitive adhesive surfaces on both surfaces (double-faced pressure-sensitive adhesive tape or sheet), or may be a pressure-sensitive adhesive tape or sheet having a pressure-sensitive adhesive surface on one surface only.

Therefore, the light-reflective/shielding pressure-sensitive adhesive tape or sheet of the invention is useful as a light-reflective/shielding pressure-sensitive adhesive tape or sheet (light-reflective pressure-sensitive adhesive tape or sheet, light-shielding pressure-sensitive adhesive tape or sheet, or light-reflective/shielding pressure-sensitive adhesive tape or sheet) for use in fixing a liquid crystal display module unit and a backlight unit in a liquid crystal display apparatus (LCD) (particularly a compact liquid crystal display apparatus) which is employed for example in so-called "mobile phones" or in so-called "PDA".

Further, the liquid crystal display apparatus of the invention includes a liquid crystal display module unit and a backlight unit and has such a structure that the liquid crystal display module unit and the backlight unit are fixed by the aforementioned light-reflective/shielding pressure-sensitive adhesive tape or sheet (namely a light-reflective/shielding pressure-sensitive adhesive tape or sheet, including a pressure-sensitive adhesive layer on at least one surface of a base material and characteristics that at least one surface thereof has a reflectance of 60% or higher and/or a transmittance of 0.3% or lower, in which the pressure-sensitive adhesive layer formed on at least one surface of the base material is formed by an acrylic pressure-sensitive adhesive composition containing an acrylic polymer (a) and a low-molecular weight polymer component (b)). In the case that the light-reflective/shielding pressure-sensitive adhesive tape or sheet has a reflectance less than 60% on one surface and a reflectance of 60% or higher on the other surface, the surface having the reflectance less than 60% may be positioned on the side of the liquid crystal display module unit and the surface having the reflectance of 60% or higher may be positioned on the side of the backlight unit, or, the surface having the reflectance less than 60% may be positioned on the side of the backlight unit and the surface having the reflectance of 60% or higher may be positioned on the side of the liquid crystal display module unit.

In a liquid crystal display apparatus (particularly a compact liquid crystal display apparatus employed in so-called "mobile phones" or so-called "PDA"), the backlight unit usually includes a polycarbonate substrate. Therefore, in adhering the light-reflective/shielding pressure-sensitive adhesive tape or sheet onto the backlight unit, it is important to use the light-reflective/shielding pressure-sensitive adhesive tape or sheet in such a form that the low-molecular weight polymer-containing pressure-sensitive adhesive layer is in contact with the polycarbonate substrate of the backlight unit.

EXAMPLES

In the following, the present invention will be further clarified by examples, but the present invention is not limited by these examples. In the examples, transmittance (%), reflectance (%) and L*, a* and b* defined in L*a*b* color space were determined by following measuring methods.

Measuring Method for Transmittance

The transmittance (%) was determined, with a spectrophotometer U4100 manufactured by Hitachi Ltd., by irradiating a surface of the pressure-sensitive adhesive tape or sheet with a light of a wavelength of 550 nm, and measuring an intensity of a light transmitted to the other surface.

Measuring Method for Reflectance

The reflectance (%) was determined, utilizing a spectrophotometer MPS-2000 manufactured by Shimadzu Corp., by irradiating a surface of white-colored film layer side in a different-colored laminated base material of the pressure-sensitive adhesive tape or sheet with a light of a wavelength of 550 nm and measuring an intensity of a light reflected from the irradiated surface.

Measuring Method for L*, a* and b*

L*, a* and b* defined in the L*a*b* color space were measured, with a color difference meter CR-200 (trade name), manufactured by Minolta Ltd.

Preparation Example 1 of Acrylic Polymer

Eighty-seven parts by weight of n-butyl acrylate, 5 parts by weight of 2-ethylhexyl acrylate, 5 parts by weight of methyl methacrylate, 3 parts by weight of acrylic acid, 0.2 parts by weight of azobisisobutyronitrile and 233.8 parts by weight of ethyl acetate as a polymerization solvent were charged in a separable flask, and were agitated for one hour under nitrogen gas introduction. After the oxygen in the polymerization system was removed in this manner, the mixture was heated to 63° C. and reacted for 10 hours to obtain a solution containing an acrylic polymer and having a solid concentration of 30 wt %. The acrylic polymer in the solution had a weight-average molecular weight of 600,000.

Preparation Example 1 of Low-Molecular Weight Polymer Component

Ninety-two parts by weight of cyclohexyl methacrylate (homopolymer (polycyclohexyl methacrylate) having a glass transition temperature of 62° C.), 4 parts by weight of n-butyl methacrylate, 4 parts by weight of acrylic acid, 1.5 parts by weight of 2-mercaptoethanol, 0.2 parts of azobisisobutyronitrile and 100 parts by weight of toluene as a polymerization solvent were charged in a separatable flask, and were agitated for one hour under nitrogen gas introduction. After the oxygen in the polymerization system was removed in this manner, the mixture was heated to 70° C. and reacted for 3 hours, further reacted at 75° C. for 2 hours to obtain a solution containing a low-molecular weight polymer component and having a solid concentration of 50 wt %. The low-molecular weight polymer component in the solution had a weight-average molecular weight of 7,000.

Preparation Example 2 of Low-Molecular Weight Polymer Component

Ninety parts by weight of isobornyl methacrylate (homopolymer (polycyisobornyl methacrylate) having a glass transition temperature of 180° C.), 6 parts by weight of n-butyl methacrylate, 4 parts by weight of acrylic acid, 1.5 parts by weight of 2-mercaptoethanol, 0.2 parts of azobisisobutyronitrile and 100 parts by weight of toluene as a polymerization solvent were charged in a separatable flask, and were agitated for one hour under nitrogen gas introduction. After the oxygen in the polymerization system was removed in this manner, the mixture was heated to 70° C. and reacted for 3 hours, further reacted at 75° C. for 2 hours to obtain a solution containing a low-molecular weight polymer component and having a solid concentration of 50 wt %. The low-molecular weight polymer component in the solution had a weight-average molecular weight of 6,000.

Preparation Example 3 of Low-Molecular Weight Polymer Component

Ninety-six parts by weight of n-butyl acrylate (homopolymer (poly-n-butyl acrylate) having a glass transition temperature of −54° C.), 4 parts by weight of acrylic acid, 1.5 parts by weight of 2-mercaptoethanol, 0.2 parts of azobisisobutyronitrile and 100 parts by weight of toluene as a polymerization solvent were charged in a separatable flask, and were agitated for one hour under nitrogen gas introduction. After the oxygen in the polymerization system was removed in this manner, the mixture was heated to 70° C. and reacted for 3 hours, further reacted at 75° C. for 2 hours to obtain a solution containing a low-molecular weight polymer component and having a solid concentration of 50 wt %. The low-molecular weight polymer component in the solution had a weight-average molecular weight of 8,000.

Preparation Example 1 of Pressure-Sensitive Adhesive

To 100 parts by weight of the acrylic polymer obtained in the preparation example 1 of the acrylic polymer, 25 parts by weight of the low-molecular weight polymer component obtained in the preparation example 1 of the low-molecular weight polymer, 0.1 parts by weight of a tetrafunctional epoxy type crosslinking agent (trade name Tetrad X, manufactured by Mitsubishi Gas Chemical Co.), and 2 parts by weight of a trifunctional isocyanate type crosslinking agent (trade name Coronate HL, manufactured by Nippon Polyurethane Industry Co.) were added to prepare an acrylic pressure-sensitive adhesive composition containing a low-molecular weight polymer component (also called "acrylic pressure-sensitive adhesive (A)"). A pressure-sensitive adhesive layer formed by the acrylic pressure-sensitive adhesive (A) had a gel fraction of 64 wt % and a temperature of −1° C. at a maximum of loss tangent.

Preparation Example 2 of Pressure-Sensitive Adhesive

To 100 parts by weight of the acrylic polymer obtained in the preparation example 1 of the acrylic polymer, 0.1 parts by weight of a tetrafunctional epoxy type crosslinking agent (trade name Tetrad X, manufactured by Mitsubishi Gas Chemical Co.), and 2 parts by weight of a trifunctional isocyanate type crosslinking agent (trade name Coronate HL, manufactured by Nippon Polyurethane Industry Co.) were added to prepare an acrylic pressure-sensitive adhesive composition not containing a low-molecular weight polymer component (also called "acrylic pressure-sensitive adhesive (B)"). A pressure-sensitive adhesive layer formed by the acrylic pressure-sensitive adhesive (B) had a gel fraction of 73 wt % and a temperature of −28° C. at a maximum of loss tangent.

Preparation Example 3 of Pressure-Sensitive Adhesive

To 100 parts by weight of the acrylic polymer obtained in the preparation example 1 of the acrylic polymer, 30 parts by weight of the low-molecular weight polymer component obtained in the preparation example 1 of the low-molecular weight polymer, 0.08 parts by weight of a tetrafunctional epoxy type crosslinking agent (trade name Tetrad X manufactured by Mitsubishi Gas Chemical Co.), and 2 parts by weight of a trifunctional isocyanate type crosslinking agent (trade name Coronate HL, manufactured by Nippon Polyurethane Industry Co.) were added to prepare an acrylic pressure-sensitive adhesive composition containing a low-molecular weight polymer component (also called "acrylic pressure-sensitive adhesive (C)"). A pressure-sensitive adhesive layer formed by the acrylic pressure-sensitive adhesive (C) had a gel fraction of 52 wt % and a temperature of −12° C. at a maximum of loss tangent.

Preparation Example 4 of Pressure-Sensitive Adhesive

To 100 parts by weight of the acrylic polymer obtained in the preparation example 1 of the acrylic polymer, 25 parts by weight of the low-molecular weight polymer component obtained in the preparation example 1 of the low-molecular weight polymer, 0.13 parts by weight of a tetrafunctional epoxy type crosslinking agent (trade name Tetrad X, manufactured by Mitsubishi Gas Chemical Co.), and 2 parts by weight of a trifunctional isocyanate type crosslinking agent (trade name Coronate HL, manufactured by Nippon Polyurethane Industry Co.) were added to prepare an acrylic pressure-sensitive adhesive composition containing a low-molecular weight polymer component (also called "acrylic pressure-sensitive adhesive (D)"). A pressure-sensitive adhesive layer formed by the acrylic pressure-sensitive adhesive (D) had a gel fraction of 75 wt % and a temperature of −10° C. at a maximum of loss tangent.

Preparation Example 5 of Pressure-Sensitive Adhesive

To 100 parts by weight of the acrylic polymer obtained in the preparation example 1 of the acrylic polymer, 30 parts by weight of the low-molecular weight polymer component obtained in the preparation example 2 of the low-molecular weight polymer, 0.12 parts by weight of a tetrafunctional epoxy type crosslinking agent (trade name Tetrad X, manufactured by Mitsubishi Gas Chemical Co.), and 2 parts by weight of a trifunctional isocyanate type crosslinking agent (trade name Coronate HL, manufactured by Nippon Polyurethane Industry Co.) were added to prepare an acrylic pressure-sensitive adhesive composition containing a low-molecular weight polymer component (also called "acrylic pressure-sensitive adhesive (E)"). A pressure-sensitive adhesive layer formed by the acrylic pressure-sensitive adhesive (E) had a gel fraction of 60 wt % and a temperature of 6° C. at a maximum of loss tangent.

Preparation Example 6 of Pressure-Sensitive Adhesive

To 100 parts by weight of the acrylic polymer obtained in the preparation example 1 of the acrylic polymer, 8 parts by weight of the low-molecular weight polymer component obtained in the preparation example 1 of the low-molecular weight polymer, 0.01 parts by weight of a tetrafunctional epoxy type crosslinking agent (trade name Tetrad X, manufactured by Mitsubishi Gas Chemical Co.), and 1 part by weight of a trifunctional isocyanate type crosslinking agent (trade name Coronate HL, manufactured by Nippon Polyurethane Industry Co.) were added to prepare an acrylic pressure-sensitive adhesive composition containing a low-molecular weight polymer component (also called "acrylic pressure-sensitive adhesive (F)"). A pressure-sensitive adhesive layer formed by the acrylic pressure-sensitive adhesive (F) had a gel fraction of 33 wt % and a temperature of −22° C. at a maximum of loss tangent.

Preparation Example 7 of Pressure-Sensitive Adhesive

To 100 parts by weight of the acrylic polymer obtained in the preparation example 1 of the acrylic polymer, 25 parts by weight of the low-molecular weight polymer component obtained in the preparation example 1 of the low-molecular weight polymer, 0.05 parts by weight of a tetrafunctional epoxy type crosslinking agent (trade name Tetrad X, manufactured by Mitsubishi Gas Chemical Co.), and 1 part by weight of a trifunctional isocyanate type crosslinking agent (trade name Coronate HL, manufactured by Nippon Polyurethane Industry Co.) were added to prepare an acrylic pressure-sensitive adhesive composition containing a low-molecular weight polymer component (also called "acrylic pressure-sensitive adhesive (G)"). A pressure-sensitive adhesive layer formed by the acrylic pressure-sensitive adhesive (G) had a gel fraction of 40 wt % and a temperature of −11° C. at a maximum of loss tangent.

Preparation Example 8 of Pressure-Sensitive Adhesive

To 100 parts by weight of the acrylic polymer obtained in the preparation example 1 of the acrylic polymer, 25 parts by weight of the low-molecular weight polymer component obtained in the preparation example 3 of the low-molecular weight polymer, 0.1 parts by weight of a tetrafunctional epoxy type crosslinking agent (trade name Tetrad X, manufactured by Mitsubishi Gas Chemical Co.), and 2 parts by weight of a trifunctional isocyanate type crosslinking agent (trade name Coronate HL, manufactured by Nippon Polyurethane Industry Co.) were added to prepare an acrylic pressure-sensitive adhesive composition containing a low-molecular weight polymer component (also called "acrylic pressure-sensitive adhesive (H)"). A pressure-sensitive adhesive layer formed by the acrylic pressure-sensitive adhesive (H) had a gel fraction of 58 wt % and a temperature of −29° C. at a maximum of loss tangent.

Example 1

On a surface of a transparent base material (polyethylene terephthalate film) of a thickness of 38 μm, a blackish ink composition, containing carbon black as a black-colored colorant, was printed 4 times (coated in 4 layers) by a gravure printing method to obtain a black-colored layer having a 4-layered structure (total thickness of the black-colored layer being 7 μm). Then, on the black-colored layer, the acrylic pressure-sensitive adhesive (A) obtained in the preparation example 1 of the pressure-sensitive adhesive was coated and dried or cured to obtain a transparent acrylic pressure-sensitive adhesive (A) layer of a thickness of 30 μm, and a separator, of which a surface was subjected to a releasing treatment with a silicone type releasing treatment agent, was laminated on the acrylic pressure-sensitive adhesive (A) layer. Also on the exposed surface of the transparent base material, the acrylic pressure-sensitive adhesive (B) obtained in the preparation example 2 of the pressure-sensitive adhesive was coated and dried or cured to obtain a transparent acrylic pressure-sensitive adhesive (B) layer of a thickness of 30 μm, and a separator, of which a surface was subjected to a releasing treatment with a silicone type releasing treatment agent, was laminated on the acrylic pressure-sensitive adhesive (B) layer, thereby obtaining a double-faced pressure-sensitive adhesive tape or sheet having a layer structure of transparent acrylic pressure-sensitive adhesive (B) layer/transparent base material/4-layered black-colored layer/transparent acrylic pressure-sensitive adhesive (A) layer.

The double-faced pressure-sensitive adhesive tape or sheet obtained in Example 1 had a transmittance of 0.01%, as measured according to the measuring method for transmittance above. Also in a measurement of $L^*$, $a^*$ and $b^*$ defined in the $L^*a^*b^*$ color space according to the measurement method for $L^*$, $a^*$ and $b^*$ above, a surface of the double-faced pressure-sensitive adhesive tape or sheet, at the side of the black-colored layer, had $L^*$ of 26.0, $a^*$ of 0.43 and $b^*$ of 0.78.

Example 2

On a surface of a white-colored base material (polyethylene terephthalate film) of a thickness of 12 μm, a whitish ink composition, containing titanium oxide as a white-colored colorant, was printed once (coated in 1 layer) by a gravure printing method to obtain a white-colored layer having a single layer structure (thickness: 2 μm). Then, on the white-colored layer, the acrylic pressure-sensitive adhesive (A) obtained in the preparation example 1 of the pressure-sensitive adhesive was coated and dried or cured to obtain a transparent acrylic pressure-sensitive adhesive (A) layer of a thickness of 30 μm, and a separator, of which a surface was subjected to a releasing treatment with a silicone type releasing treatment agent, was laminated on the acrylic pressure-sensitive adhesive (A) layer. Also on the exposed surface of the white-colored base material, the acrylic pressure-sensitive adhesive (B) obtained in the preparation example 2 of the pressure-sensitive adhesive was coated and dried or cured to obtain a transparent acrylic pressure-sensitive adhesive (B) layer of a thickness of 30 μm, and a separator, of which a surface was subjected to a releasing treatment with a silicone type releasing treatment agent, was laminated on the acrylic pressure-sensitive adhesive (B) layer, thereby obtaining a double-faced pressure-sensitive adhesive tape or sheet having a layer structure of transparent acrylic pressure-sensitive adhesive (B) layer/white-colored base material/white-colored layer/transparent acrylic pressure-sensitive adhesive (A) layer.

The double-faced pressure-sensitive adhesive tape or sheet obtained in Example 2 had a reflectance of 85% on a surface at the side of the white-colored layer, as measured according to the measuring method for reflectance above. Also in a measurement as in Example 1 for $L^*$, $a^*$ and $b^*$ defined in the $L^*a^*b^*$ color space, a surface of the double-faced pressure-sensitive adhesive tape or sheet, at the side of the white-colored layer, had $L^*$ of 92.6, $a^*$ of −0.5 and $b^*$ of −0.9.

Example 3

On a surface of a white-colored base material (polyethylene terephthalate film) of a thickness of 12 μm, a whitish ink composition, containing titanium oxide as a white-colored colorant, was printed once (coated in 1 layer) by a gravure printing method to obtain a white-colored layer having a single layer structure (thickness:2 μm), and then a blackish ink composition, containing carbon black as a black-colored colorant, was printed, on the white-colored layer, 4 times (coated in 4 layers) by a gravure printing method to obtain a black-colored layer having a 4-layered structure (total thickness of the black-colored layer being 7 μm). Then, on the black-colored layer, the acrylic pressure-sensitive adhesive (B) obtained in the preparation example 2 of the pressure-sensitive adhesive was coated and dried or cured to obtain a transparent acrylic pressure-sensitive adhesive (B) layer of a thickness of 30 μm, and a separator, of which a surface was subjected to a releasing treatment with a silicone type releasing treatment agent, was laminated on the acrylic pressure-sensitive adhesive (B) layer. Also on the exposed surface of the white-colored base material, the acrylic pressure-sensitive adhesive (A) obtained in the preparation example 1 of the pressure-sensitive adhesive was coated and dried or cured to obtain a transparent acrylic pressure-sensitive adhesive (A) layer of a thickness of 30 μm, and a separator, of which a surface was subjected to a releasing treatment with a silicone type releasing treatment agent, was laminated on the acrylic pressure-sensitive adhesive (A) layer, thereby obtaining a double-faced pressure-sensitive adhesive tape or sheet having a layer structure of transparent acrylic pressure-sensitive adhesive (A) layer/white-colored base material/white-colored layer/4 black-colored layers/transparent acrylic pressure-sensitive adhesive (B) layer.

The double-faced pressure-sensitive adhesive tape or sheet obtained in Example 3 had a transmittance of 0.01% as measured in the same manner as in Example 1. Also in a measurement as in Example 1 for $L^*$, $a^*$ and $b^*$ defined in the $L^*a^*b^*$ color space, a surface of the double-faced pressure-sensitive adhesive tape or sheet, at the side of the black-colored layer, had $L^*$ of 28.9, $a^*$ of 0.48 and $b^*$ of 1.08.

Also the double-faced pressure-sensitive adhesive tape or sheet obtained in Example 3 had a reflectance of 86%, on a surface at the side of the white-colored base material, as measured in the same manner as in Example 2. Also in a measurement as in Example 1 or 2 for $L^*$, $a^*$ and $b^*$ defined in the $L^*a^*b^*$ color space, a surface of the double-faced pressure-sensitive adhesive tape or sheet, at the side of the white-colored base material, had $L^*$ of 92.1, $a^*$ of −0.3 and $b^*$ of −0.8.

Example 4

A double-faced pressure-sensitive adhesive tape or sheet was obtained in the same manner as in Example 3, except that the acrylic pressure-sensitive adhesive (B) obtained in the preparation example 2 of the pressure-sensitive adhesive was replaced by the acrylic pressure-sensitive adhesive (A) obtained in the preparation example 1 of the pressure-sensitive adhesive. Thus, the double-faced pressure-sensitive adhesive tape or sheet of Example 4 had a layer structure of transparent acrylic pressure-sensitive adhesive (A) layer/white-colored base material/white-colored layer/4 black-colored layers/transparent acrylic pressure-sensitive adhesive (A) layer.

The double-faced pressure-sensitive adhesive tape or sheet obtained in Example 4 had a transmittance of 0.01% as measured in the same manner as in Example 1. Also in a measurement as in Example 1 for $L^*$, $a^*$ and $b^*$ defined in the $L^*a^*b^*$ color space, a surface of the double-faced pressure-sensitive adhesive tape or sheet, at the side of the black-colored layer, had $L^*$ of 27.5, $a^*$ of 0.45 and $b^*$ of 0.88.

Also the double-faced pressure-sensitive adhesive tape or sheet obtained in Example 4 had a reflectance of 85%, on a surface at the side of the white-colored base material, as measured in the same manner as in Example 2. Also in a measurement as in Example 1 or 2 for $L^*$, $a^*$ and $b^*$ defined in the $L^*a^*b^*$ color space, a surface of the double-faced pressure-sensitive adhesive tape or sheet, at the side of the white-colored base material, had $L^*$ of 92.3, $a^*$ of −0.4 and $b^*$ of −0.8.

Example 5

A double-faced pressure-sensitive adhesive tape or sheet was obtained in the same manner as in Example 4, except that the acrylic pressure-sensitive adhesive (A) obtained in the preparation example 1 of the pressure-sensitive adhesive was replaced by the acrylic pressure-sensitive adhesive (C) obtained in the preparation example 3 of the pressure-sensitive adhesive. Thus, the double-faced pressure-sensitive adhesive tape or sheet of Example 5 had a layer structure of transparent acrylic pressure-sensitive adhesive (C) layer/white-colored base material/white-colored layer/4 black-colored layers/transparent acrylic pressure-sensitive adhesive (C) layer.

The double-faced pressure-sensitive adhesive tape or sheet obtained in Example 5 had a transmittance of 0.01% as measured in the same manner as in Example 1. Also in a measurement as in Example 1 for $L^*$, $a^*$ and $b^*$ defined in the $L^*a^*b^*$ color space, a surface of the double-faced pressure-sensitive adhesive tape or sheet, at the side of the black-colored layer, had $L^*$ of 28.3, $a^*$ of 0.43 and $b^*$ of 0.80.

Also the double-faced pressure-sensitive adhesive tape or sheet obtained in Example 5 had a reflectance of 85%, on a surface at the side of the white-colored base material, as measured in the same manner as in Example 2. Also in a measurement as in Example 1 or 2 for $L^*$, $a^*$ and $b^*$ defined in the $L^*a^*b^*$ color space, a surface of the double-faced pressure-sensitive adhesive tape or sheet, at the side of the white-colored base material, had $L^*$ of 92.4, $a^*$ of −0.4 and $b^*$ of −0.8.

Example 6

A double-faced pressure-sensitive adhesive tape or sheet was obtained in the same manner as in Example 4, except that the acrylic pressure-sensitive adhesive (A) obtained in the preparation example 1 of the pressure-sensitive adhesive was replaced by the acrylic pressure-sensitive adhesive (D) obtained in the preparation example 4 of the pressure-sensitive adhesive. Thus, the double-faced pressure-sensitive adhesive tape or sheet of Example 6 had a layer structure of transparent acrylic pressure-sensitive adhesive (D) layer/white-colored base material/white-colored layer/4 black-colored layers/transparent acrylic pressure-sensitive adhesive (D) layer.

The double-faced pressure-sensitive adhesive tape or sheet obtained in Example 6 had a transmittance of 0.01% as measured in the same manner as in Example 1. Also in a measurement as in Example 1 for $L^*$, $a^*$ and $b^*$ defined in the $L^*a^*b^*$ color space, a surface of the double-faced pressure-sensitive adhesive tape or sheet, at the side of the black-colored layer, had $L^*$ of 28.6, $a^*$ of 0.45 and $b^*$ of 0.85.

Also the double-faced pressure-sensitive adhesive tape or sheet obtained in Example 6 had a reflectance of 85%, on a surface at the side of the white-colored base material, as measured in the same manner as in Example 2. Also in a measurement as in Example 1 or 2 for $L^*$, $a^*$ and $b^*$ defined in the L*a*b* color space, a surface of the double-faced pressure-sensitive adhesive tape or sheet, at the side of the white-colored base material, had L* of 92.2, a* of −0.4 and b* of −0.7.

Example 7

A double-faced pressure-sensitive adhesive tape or sheet was obtained in the same manner as in Example 4, except that the acrylic pressure-sensitive adhesive (A) obtained in the preparation example 1 of the pressure-sensitive adhesive was replaced by the acrylic pressure-sensitive adhesive (E) obtained in the preparation example 5 of the pressure-sensitive adhesive. Thus, the double-faced pressure-sensitive adhesive tape or sheet of Example 7 had a layer structure of transparent acrylic pressure-sensitive adhesive (E) layer/white-colored base material/white-colored layer/4 black-colored layers/transparent acrylic pressure-sensitive adhesive (E) layer.

The double-faced pressure-sensitive adhesive tape or sheet obtained in Example 7 had a transmittance of 0.01% as measured in the same manner as in Example 1. Also in a measurement as in Example 1 for L*, a* and b* defined in the L*a*b* color space, a surface of the double-faced pressure-sensitive adhesive tape or sheet, at the side of the black-colored layer, had L* of 27.3, a* of 0.43 and b* of 0.83.

Also the double-faced pressure-sensitive adhesive tape or sheet obtained in Example 7 had a reflectance of 83%, on a surface at the side of the white-colored base material, as measured in the same manner as in Example 2. Also in a measurement as in Example 1 or 2 for L*, a* and b* defined in the L*a*b* color space, a surface of the double-faced pressure-sensitive adhesive tape or sheet, at the side of the white-colored base material, had L* of 92.1, a* of −0.3 and b* of −0.5.

Comparative Example 1

A double-faced pressure-sensitive adhesive tape or sheet was obtained in the same manner as in Example 1, except that the acrylic pressure-sensitive adhesive (A) obtained in the preparation example 1 of the pressure-sensitive adhesive was replaced by the acrylic pressure-sensitive adhesive (B) obtained in the preparation example 2 of the pressure-sensitive adhesive. Thus, the double-faced pressure-sensitive adhesive tape or sheet of Comparative Example 1 had a layer structure of transparent acrylic pressure-sensitive adhesive (B) layer/transparent base material/4 black-colored layers/transparent acrylic pressure-sensitive adhesive (B) layer.

Comparative Example 2

A double-faced pressure-sensitive adhesive tape or sheet was obtained in the same manner as in Example 2, except that the acrylic pressure-sensitive adhesive (A) obtained in the preparation example 1 of the pressure-sensitive adhesive was replaced by the acrylic pressure-sensitive adhesive (B) obtained in the preparation example 2 of the pressure-sensitive adhesive. Thus, the double-faced pressure-sensitive adhesive tape or sheet of Comparative Example 2 had a layer structure of transparent acrylic pressure-sensitive adhesive (B) layer/white-colored base material/white-colored layer/transparent acrylic pressure-sensitive adhesive (B) layer.

Comparative Example 3

A double-faced pressure-sensitive adhesive tape or sheet was obtained in the same manner as in Example 3, except that the acrylic pressure-sensitive adhesive (A) obtained in the preparation example 1 of the pressure-sensitive adhesive was replaced by the acrylic pressure-sensitive adhesive (B) obtained in the preparation example 2 of the pressure-sensitive adhesive. Thus, the double-faced pressure-sensitive adhesive tape or sheet of Comparative Example 3 had a layer structure of transparent acrylic pressure-sensitive adhesive (B) layer/white-colored base material/white-colored layer/4 black-colored layers/transparent acrylic pressure-sensitive adhesive (B) layer.

Comparative Example 4

A double-faced pressure-sensitive adhesive tape or sheet was obtained in the same manner as in Example 4, except that the acrylic pressure-sensitive adhesive (A) obtained in the preparation example 1 of the pressure-sensitive adhesive was replaced by the acrylic pressure-sensitive adhesive (F) obtained in the preparation example 6 of the pressure-sensitive adhesive. Thus, the double-faced pressure-sensitive adhesive tape or sheet of Comparative Example 4 had a layer structure of transparent acrylic pressure-sensitive adhesive (F) layer/white-colored base material/white-colored layer/4 black-colored layers/transparent acrylic pressure-sensitive adhesive (F) layer.

Comparative Example 5

A double-faced pressure-sensitive adhesive tape or sheet was obtained in the same manner as in Example 4, except that the acrylic pressure-sensitive adhesive (A) obtained in the preparation example 1 of the pressure-sensitive adhesive was replaced by the acrylic pressure-sensitive adhesive (G) obtained in the preparation example 7 of the pressure-sensitive adhesive. Thus, the double-faced pressure-sensitive adhesive tape or sheet of Comparative Example 5 had a layer structure of transparent acrylic pressure-sensitive adhesive (G) layer/white-colored base material/white-colored layer/4 black-colored layers/transparent acrylic pressure-sensitive adhesive (G) layer.

Comparative Example 6

A double-faced pressure-sensitive adhesive tape or sheet was obtained in the same manner as in Example 4, except that the acrylic pressure-sensitive adhesive (A) obtained in the preparation example 1 of the pressure-sensitive adhesive was replaced by the acrylic pressure-sensitive adhesive (H) obtained in the preparation example 8 of the pressure-sensitive adhesive. Thus, the double-faced pressure-sensitive adhesive tape or sheet of Comparative Example 6 had a layer structure of transparent acrylic pressure-sensitive adhesive (H) layer/white-colored base material/white-colored layer/4 black-colored layers/transparent acrylic pressure-sensitive adhesive (H) layer.

Evaluation

The double-faced pressure-sensitive adhesive tapes or sheets obtained in Examples 1 to 7 and Comparative Examples 1 to 6 were evaluated for the repulsion resistance by the following evaluation method for repulsion resistance. As a result, each of the double-faced pressure-sensitive adhesive tapes or sheets of Examples 1 to 7 was excellent in the repulsion resistance. More specifically, when an FPC in a bent state was adhered to a backlight unit and a liquid crystal display module unit, each of the double-faced pressure-sensitive adhesive tapes or sheets of Examples 1 to 7 was not peeled off and could maintain a satisfactorily adhered state, thus being excellent in the repulsion resistance. This is presumably because the double-faced pressure-sensitive adhesive tapes or sheets of Examples 1 to 7 are used in such a form that the pressure-sensitive adhesive layer formed by the acrylic pressure-sensitive adhesive containing the low-molecular weight polymer component (low-molecular weight polymer-containing pressure-sensitive adhesive layer) is in contact with the polycarbonate substrate in the backlight unit, whereby the low-molecular weight polymer-containing pressure-sensitive adhesive layer and the polycarbonate substrate are adhered with an excellent contact, so that bubbles eventually generated from the polycarbonate substrate are not trapped in the interface between the low-molecular weight polymer-containing pressure-sensitive adhesive layer and the polycarbonate substrate, thereby effectively suppressing or preventing a separation or a peeling at the interface between the low-molecular weight polymer-containing pressure-sensitive adhesive layer and the polycarbonate substrate.

On the other hand, in the double-faced pressure-sensitive adhesive tapes or sheets of Comparative Examples 1 to 6, the pressure-sensitive adhesive layer formed by the acrylic pressure-sensitive adhesive not containing the low-molecular weight polymer component (low-molecular weight polymer-free pressure-sensitive adhesive layer) is in contact with the polycarbonate substrate in the backlight unit, so that bubbles eventually generated from the polycarbonate substrate are trapped in the interface between the low-molecular weight polymer-containing pressure-sensitive adhesive layer and the polycarbonate substrate, thereby presumably causing a separation or a peeling at the interface between the low-molecular weight polymer-containing pressure-sensitive adhesive layer and the polycarbonate substrate.

Also the double-faced pressure-sensitive adhesive tapes or sheets obtained in Examples 1 to 7 and Comparative Examples 1 to 6 were evaluated for the resistance to displacement in case of a dropping, by the following evaluation method for displacement resistance. As a result, each of the double-faced pressure-sensitive adhesive tapes or sheets of Examples 1 to 7 was excellent in the displacement resistance.

On the other hand, in the evaluation of displacement resistance, each of the double-faced pressure-sensitive adhesive tapes or sheets of Comparative Examples 1 to 6 showed a displacement distance of 0.3 mm or larger in a dropping from a height of 1 m, the displacement distance being larger than in Examples. A double-faced pressure-sensitive adhesive tape or sheet showing a displacement distance of 0.3 mm or larger in a dropping from a height of 1 m, when employed in fixing the liquid crystal display module unit and the backlight unit in so-called "mobile phone", is liable to cause a cracking in the liquid crystal display glass, when the mobile phone is accidentally dropped.

These results of evaluations are summarized in Tables 1 and 2.

Evaluation Method for Repulsion Resistance

Figure 1B:
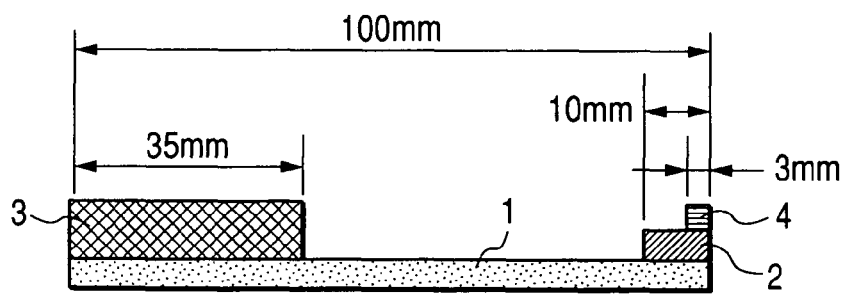

As illustrated by in FIGS. 1A and 1B, on an end portion of an FPC (flexible printed circuit board, thickness: about 110 µm) cut into a size of a width of 10 mm and a length of 100 mm, adhered was a polyethylene terephthalate film with pressure-sensitive adhesive (width: 10 mm, length: 10 mm, thickness: about 110 µm), having an ultraviolet-curable coating (surface formed by coating an acrylic ultraviolet-curable paint with a silicone oil content of 0.2 wt %). On the other end portion of FPC, a polycarbonate plate (width: 10 mm, length: 35 mm, thickness: 2 mm) was adhered with a double-faced pressure-sensitive adhesive tape. A sample of the double-faced pressure-sensitive adhesive tape or sheet (width: 10 mm, length: 3 mm) was adhered to an end portion of the ultraviolet-curable coated surface of the polyethylene terephthalate film, and was let to stand for 24 hours at 23° C. In the case that the sample of the double-faced pressure-sensitive adhesive tape or sheet has a white/black type base material, the black side is adhered to the ultraviolet-curable coated surface of the polyethylene terephthalate film. In the case that the low-molecular weight polymer-containing pressure-sensitive adhesive layer is coated on one surface only, the low-molecular weight polymer-containing pressure-sensitive adhesive layer is positioned at the upper side, and the low-molecular weight polymer-free pressure-sensitive adhesive layer is positioned at the lower side (adhered to the ultraviolet-curable coated surface).

Figure 2:
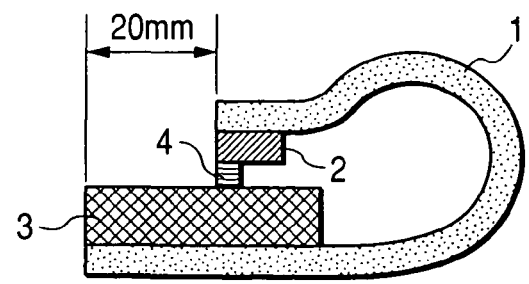
FIG. 2 is a schematic lateral view illustrating a state where the FPC is bent in a loop for measuring the repulsion resistance.

Then, as illustrated in FIG. 2, FPC was bent in a loop and the sample double-faced pressure-sensitive adhesive tape or sheet was adhered in such a manner that the end thereof was positioned at 20 mm from the end of the polycarbonate plate. Then after 24 hours at the normal temperature and further after 24 hours at 80° C., a separation distance of FPC (namely a maximum distance between the pressure-sensitive adhesive surface of the sample of the double-faced pressure-sensitive adhesive tape or sheet and the surface of the polycarbonate plate) was measured by a digital microscope, and the repulsion resistance was evaluated by such separation distance of FPC.

FIGS. 1 and 2 are schematic views showing the method for evaluating the repulsion resistance, used in evaluating the repulsion resistance of Examples. More specifically, FIG. 1A is a schematic plan view illustrating a state where the polycarbonate plate and the double-faced pressure-sensitive adhesive tape or sheet are adhered to the FPC, and FIG. 1B is a schematic lateral view of FIG. 1A. FIG. 2 is a schematic lateral view illustrating a state where the FPC is bent in a loop for measuring the repulsion resistance. In FIGS. 1A, 1B and 2, there are illustrated an FPC 1, a polyethylene terephthalate film 2, a polycarbonate plate 3, and a sample 4 of the double-faced pressure-sensitive adhesive tape or sheet.

Evaluation Method for Displacement Resistance

A sample of the double-faced pressure-sensitive adhesive tape or sheet was punched into a frame shape having an external dimension of 30 mm×40 mm, and a width of 2 mm.

Figure 3A:
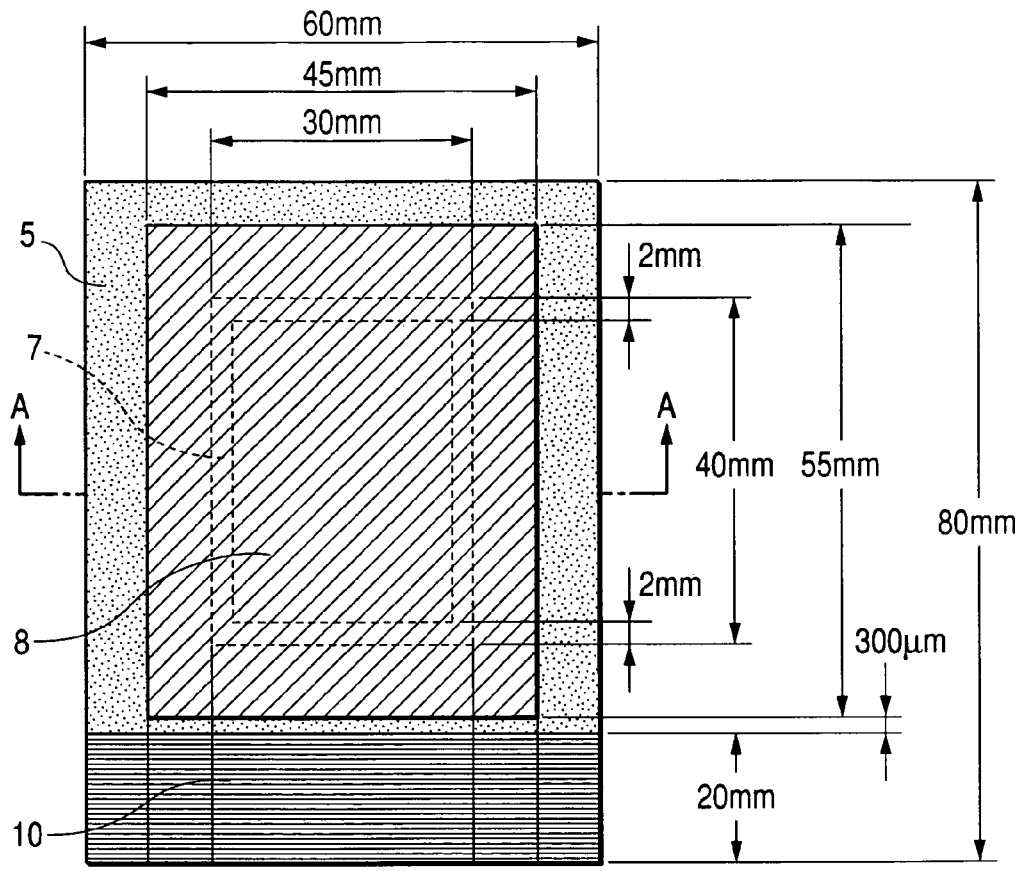
Figure 3B:
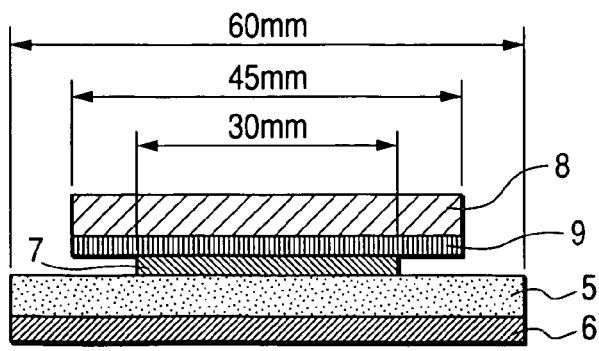

Then, as illustrated by FIGS. 3A and 3B, on a glass plate (borosilicate glass, manufactured by Matsunami Glass Co.) of a width of 45 mm, a length of 55 mm and a thickness of 0.4 mm, adhered was a polyethylene terephthalate film with pressure-sensitive adhesive (width: 45 mm, length: 55 mm, thickness: about 110 µm), having an ultraviolet-curable coating (surface formed by coating an acrylic ultraviolet-curable paint with a silicone oil content of 0.2 wt %). At the center of the polyethylene terephthalate film, the punched sample of the double-faced pressure-sensitive adhesive tape or sheet was adhered. In the punched sample of the double-faced pressure-sensitive adhesive tape or sheet, when the low-molecular weight polymer-containing pressure-sensitive adhesive layer is coated on one surface only, the low-molecular weight polymer-free pressure-sensitive adhesive layer is positioned at the upper side (adhered to the surface of the polyethylene terephthalate film), and the low-molecular weight polymer-containing pressure-sensitive adhesive layer is positioned at the lower side.

On the other hand, on a polycarbonate plate (width: 60 mm, length: 80 mm, thickness: 2 mm) adhered at the rear surface thereof to a metal plate of 100 g, a polycarbonate stopping plate (width: 60 mm, length: 20 mm, thickness: 2 mm) was fixed so as to be aligned at a side thereof as illustrated in FIG. 3A, by means of a double-faced adhesive tape of a strong adhesive property (HJ-3160W, manufactured by Nitto Denko Corp.). (In case of dropping, the stopping plate is positioned at the lower side.)

On the polycarbonate plate, adhered was the sample of the double-faced pressure-sensitive adhesive tape or sheet which was adhered the glass plate having the polyethylene terephthalate film. In this case, as illustrated by FIG. 3A, it was spaced by a gap of 300 μm from the polycarbonate stopping plate. The gap of 300 μm was formed by placing an aluminum plate of a thickness of 300 μm, then fixing the glass plate and extracting the aluminum plate.

Figure 4:
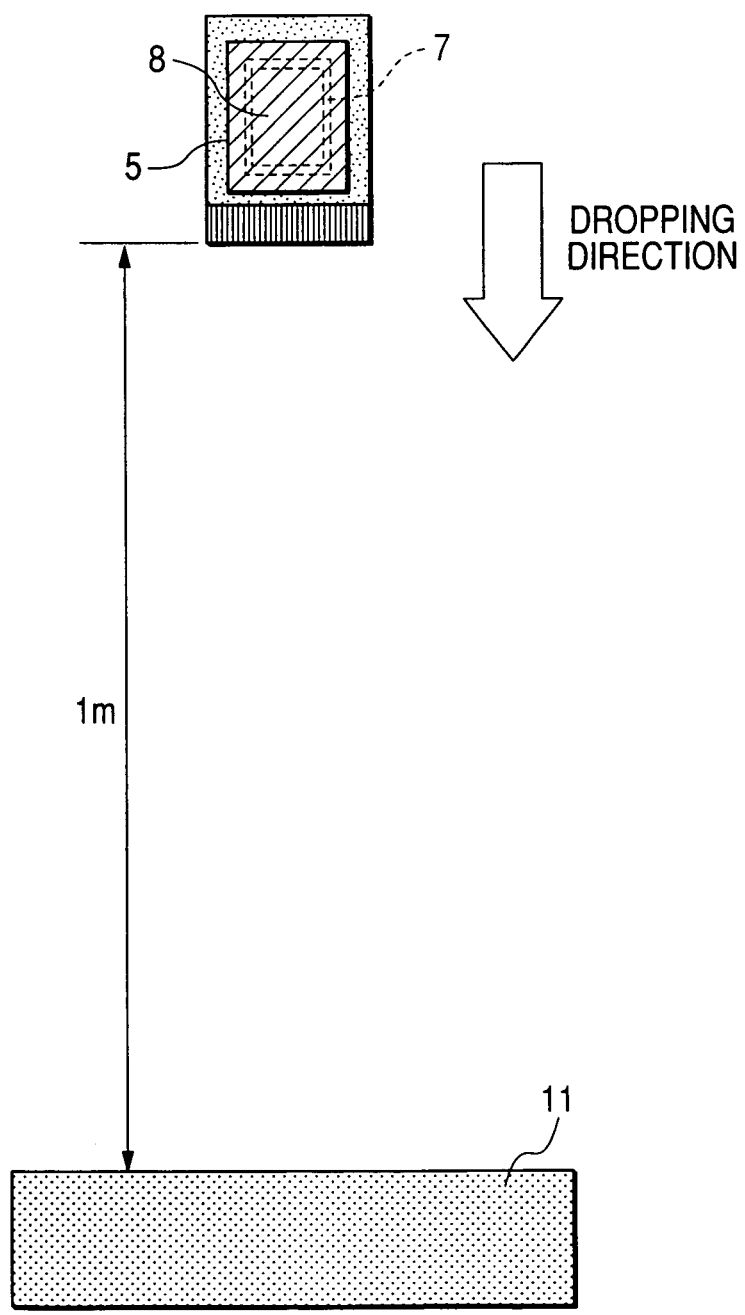
FIG. 4 is a schematic view illustrating a state where the test sample in FIG. 3 is dropped from a height of 1 m, for measuring the displacement resistance.

The sample in such state (hereinafter called test sample) was let to stand at 23° C. for 24 hours, and was dropped, as illustrated in FIG. 4, vertically onto a marble plate from a height of 1 m at 23° C. In the case that the sample of the double-faced pressure-sensitive adhesive tape, used for fixing the glass plate, has a poor displacement resistance and that the glass plate is displaced by 300 μm or more by the impact of dropping, the glass plate collides with the polycarbonate stopping plate and becomes broken.

The displacement resistance of the double-faced pressure-sensitive adhesive tape was determined as satisfactory (+) or poor (−) respectively when the glass plate was not broken or was broken after the dropping.

FIGS. 3A, 3B and 4 are schematic views showing the method for evaluating the displacement resistance, used in evaluating the displacement resistance of Examples. More specifically, FIG. 3A is a schematic plan view illustrating a test sample formed by adhering the polycarbonate plate by the double-faced pressure-sensitive adhesive tape of the sample to the polycarbonate plate, and FIG. 3B is a schematic cross-sectional view of FIG. 3A. FIG. 4 is a schematic view illustrating a state where the test sample in FIGS. 3A and 3B is dropped from a height of 1 m, for measuring the displacement resistance. In FIGS. 3A, 3B and 4, there are illustrated a polycarbonate plate 5, a metal plate 6, a sample 7 of the double-faced pressure-sensitive adhesive tape or sheet, a glass plate 8, a polyethylene terephthalate film 9, a polycarbonate plate (stopping plate) 10, and a marble 11.

TABLE 1

| | Example | | | | | | |
|---|---|---|---|---|---|---|---|
| | 1 | 2 | 3 | 4 | 5 | 6 | 7 |
| Repulsion resistance | | | | | | | |
| separation distance after 24 hours at room temp. (mm) | 0.14 | 0.11 | 0.12 | 0.12 | 0.14 | 0.11 | 0.11 |
| separation distance after further 24 hours at 80° C. (mm) | 0.17 | 0.13 | 0.15 | 0.16 | 0.18 | 0.12 | 0.13 |
| evaluation | + | + | + | + | + | + | + |
| Displacement resistance | + | + | + | + | + | + | + |

TABLE 2

| | Comparative Example | | | | | |
|---|---|---|---|---|---|---|
| | 1 | 2 | 3 | 4 | 5 | 6 |
| Repulsion resistance | | | | | | |
| separation distance after 24 hours at room temp. (mm) | 0.40 | 0.35 | 0.37 | 0.52 | 0.45 | peeling |
| separation distance after further 24 hours at 80° C. (mm) | peeling | peeling | peeling | peeling | peeling | peeling |
| evaluation | − | − | − | − | − | − |
| Displacement resistance | − | − | − | − | − | − |

While the present invention has been described in detail and with reference to specific embodiments thereof, it will be apparent to one skilled in the art that various changes and modifications can be made therein without departing from the scope thereof.

This application is based on Japanese patent application No. 2006-043759 filed Feb. 21, 2006 and Japanese patent application No. 2006-333194 filed Dec. 11, 2006, the entire contents thereof being hereby incorporated by reference.

Further, all the documents described herein are incorporated by reference.

What is claimed is:

1. A pressure-sensitive adhesive tape or sheet having a light-reflective property and/or a light-shielding property, which comprises:
a base material; and
at least one pressure-sensitive adhesive layer disposed on at least one surface of the base material, said pressure-sensitive adhesive layer being formed by an acrylic pressure-sensitive adhesive composition containing an acrylic polymer (a) and a low-molecular weight polymer component (b) which contains, as a principal monomer component, an ethylenic unsaturated monomer having a glass transition temperature of from 60 to 190° C. when it is formed into a homopolymer and having a cyclic structure within the molecule thereof, and which has a weight-average molecular weight equal to or higher than 3,000 but lower than 20,000, wherein the pressure-sensitive adhesive layer has a gel fraction of from 51 to 75 wt % and a temperature, at a maximum of loss tangent (tan δ), of from −14 to 25° C., and wherein the pressure-sensitive adhesive tape or sheet has a reflectance of 60% or higher on at least one surface thereof and/or a transmittance of 0.3% or lower.

2. The pressure-sensitive adhesive tape or sheet according to claim 1, wherein, in the acrylic pressure-sensitive adhesive composition, the low-molecular weight polymer component (b) is present in a proportion of from 10 to 35 parts by weight with respect to 100 parts by weight of the acrylic polymer (a).

3. The pressure-sensitive adhesive tape or sheet according to claim 1, which has a reflective layer for providing a reflectance of 60% or higher on at least one surface of the pressure-sensitive adhesive tape or sheet, said reflective layer being a white-colored layer having a white color or a silver-colored layer having a silver color, wherein the reflective layer is the base material, the pressure-sensitive adhesive layer, or an optional layer other than the base material and the pressure-sensitive adhesive layer.

4. The pressure-sensitive adhesive tape or sheet according to claim 1, which has a light-shielding layer for providing a transmittance of 0.3% or lower, said light-shielding layer being a black-colored layer having a black color, wherein the light-shielding layer is the base material, the pressure-sensitive adhesive layer, or an optional layer other than the base material and the pressure-sensitive adhesive layer.

5. The pressure-sensitive adhesive tape or sheet according claim 1, which is for use in fixing a liquid crystal display module unit and a backlight unit.

6. A liquid crystal display apparatus, comprising:

a liquid crystal display module unit;

a backlight unit, and the pressure-sensitive adhesive tape or sheet according to claim 1, which fixes the liquid crystal display module unit and the backlight unit.

7. The liquid crystal display apparatus according to claim 6, wherein the backlight unit has a polycarbonate substrate, and wherein the pressure-sensitive adhesive tape or sheet is used in such a form that the pressure-sensitive adhesive layer formed by the acrylic pressure-sensitive adhesive composition containing the acrylic polymer (a) and the low-molecular weight polymer component (b) is in contact with the polycarbonate substrate of the backlight unit.

* * * * *